(12) United States Patent
Fujita

(10) Patent No.: US 10,630,950 B2
(45) Date of Patent: Apr. 21, 2020

(54) PROJECTION TYPE DISPLAY DEVICE, PROJECTION CONTROL METHOD, PROJECTION CONTROL PROGRAM

(71) Applicant: FUJIFILM Corporation, Tokyo (JP)

(72) Inventor: Koudai Fujita, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 16/057,835

(22) Filed: Aug. 8, 2018

(65) Prior Publication Data

US 2018/0352204 A1   Dec. 6, 2018

Related U.S. Application Data

(63) Continuation of application No. PCT/JP2017/001619, filed on Jan. 19, 2017.

(30) Foreign Application Priority Data

Mar. 9, 2016   (JP) .................................. 2016-046052

(51) Int. Cl.
  *G09G 5/00*   (2006.01)
  *H04N 9/31*   (2006.01)
  (Continued)

(52) U.S. Cl.
  CPC ........... *H04N 9/3188* (2013.01); *B60K 35/00* (2013.01); *G02B 27/01* (2013.01);
  (Continued)

(58) Field of Classification Search
  CPC ........ G09G 3/001; G09G 3/002; G09G 3/003; G09G 3/30; G09G 3/3233; G09G 2380/10; G06F 3/011; G06F 3/012
  See application file for complete search history.

(56) References Cited

U.S. PATENT DOCUMENTS 5,988,817 A   11/1999 Mizushima et al.
7,901,097 B2   3/2011 Hirata et al.
(Continued)

FOREIGN PATENT DOCUMENTS

CN   101257637   9/2008
CN   101917632   12/2010
(Continued)

OTHER PUBLICATIONS

"International Search Report (Form PCT/ISA/210) of PCT/JP2017/001619", dated Mar. 14, 2017, with English translation thereof, pp. 1-5.
(Continued)

*Primary Examiner* — Vijay Shankar
(74) *Attorney, Agent, or Firm* — JCIPRNET

(57) ABSTRACT

Provided are a projection type display device, a projection control method, and a non-transitory recording medium readable by a computer for recording a projection control program capable of smoothly changing shapes of projection ranges of image light. A projection type display device 1 includes: projection units 11 and 12 that project image light to a projection surface 4; a drive mechanism 13 for controlling a position, on the projection surface, of a projection range of the image light projected by the projection unit 12; and a controller 60 that controls the drive mechanism 13 and changes a length, in one direction, of a range obtained by combining projection ranges of the image light projected by the respective projection units 11 and 12 and a length, in a direction orthogonal to the one direction, of the range, respectively.

21 Claims, 20 Drawing Sheets

(51) Int. Cl.
*B60K 35/00* (2006.01)
*G02B 27/01* (2006.01)
*G09G 3/00* (2006.01)

(52) U.S. Cl.
CPC ......... *G02B 27/0149* (2013.01); *H04N 9/312* (2013.01); *H04N 9/3138* (2013.01); *H04N 9/3147* (2013.01); *B60K 2370/1529* (2019.05); *B60K 2370/331* (2019.05); *B60K 2370/334* (2019.05); *G02B 2027/0154* (2013.01); *G09G 3/001* (2013.01); *G09G 2380/10* (2013.01)

(56) References Cited

U.S. PATENT DOCUMENTS

| | | | |
|---|---|---|---|
| 8,733,953 | B2 | 5/2014 | Hirata et al. |
| 10,412,354 | B2 * | 9/2019 | Fujita ................... H04N 9/3147 |
| 10,450,728 | B2 * | 10/2019 | Fujita ................ G02B 27/0101 |
| 2010/0309391 | A1 | 12/2010 | Plut |
| 2013/0187770 | A1 | 7/2013 | Moussa et al. |
| 2013/0188259 | A1 | 7/2013 | Nakamura et al. |
| 2013/0309391 | A1 | 11/2013 | Latoski |
| 2016/0124231 | A1 | 5/2016 | Watanabe et al. |
| 2018/0373033 | A1 * | 12/2018 | Oshima .................. B60K 35/00 |
| 2019/0212550 | A1 * | 7/2019 | Fujita ..................... B60K 35/00 |
| 2019/0302453 | A1 * | 10/2019 | Oshima .................. B60R 11/02 |

FOREIGN PATENT DOCUMENTS

| | | |
|---|---|---|
| JP | H10301202 | 11/1998 |
| JP | 2012529222 | 11/2012 |
| JP | 2012529223 | 11/2012 |
| JP | 2013137355 | 7/2013 |
| JP | 2013148901 | 8/2013 |
| JP | 2015011212 | 1/2015 |
| JP | 2016068577 | 5/2016 |
| WO | 2012036098 | 3/2012 |

OTHER PUBLICATIONS

"Written Opinion of the International Searching Authority of PCT/JP2017/001619" with English translation thereof, dated Mar. 14, 2017, p. 1-p. 14.

"Office Action of China Counterpart Application," dated Jan. 29, 2019, with English translation thereof, p. 1-p. 20.

* cited by examiner

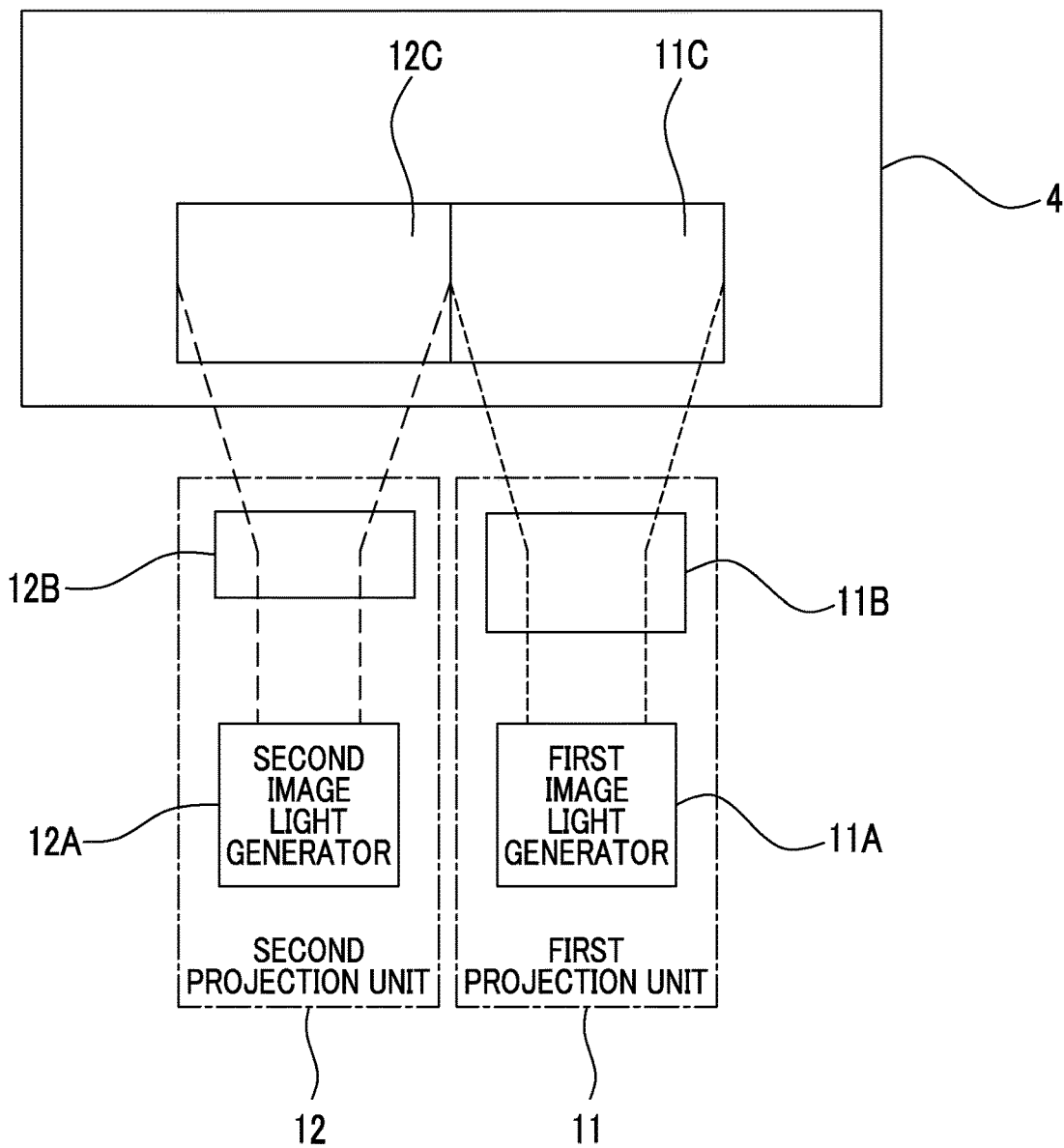

FIG. 22
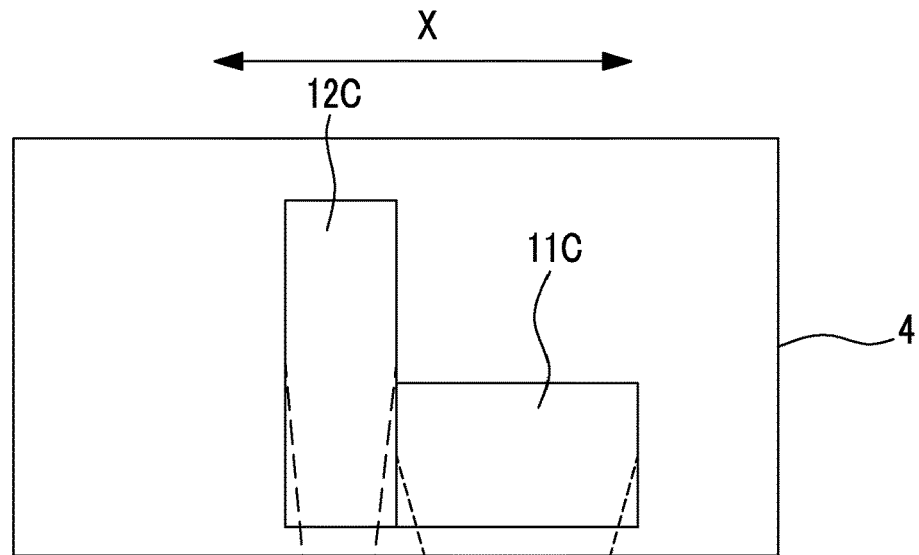
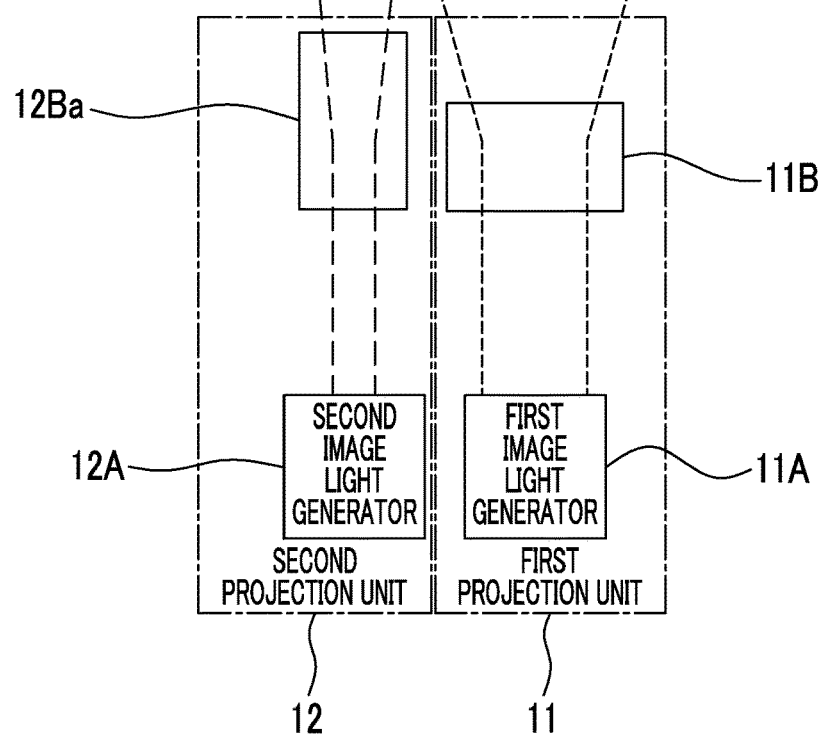
FIG. 23
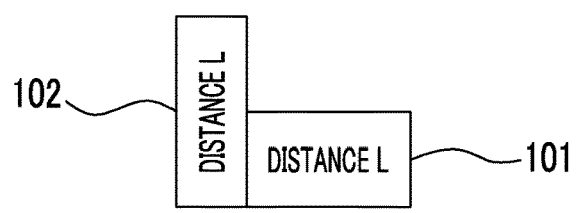

PROJECTION TYPE DISPLAY DEVICE, PROJECTION CONTROL METHOD, PROJECTION CONTROL PROGRAM

CROSS-REFERENCE TO RELATED APPLICATIONS

This application is a Continuation of PCT International Application No. PCT/JP2017/001619 filed on Jan. 19, 2017, which claims priority under 35 U.S.O §119(a) to Japanese Patent Application No. 2016-046052 filed on Mar. 9, 2016. Each of the above application(s) is hereby expressly incorporated by reference, in its entirety, into the present application.

BACKGROUND OF THE INVENTION

1. Field of the Invention

The present invention relates to a projection type display device, a projection control method, and a non-transitory recording medium readable by a computer for recording a projection control program.

2. Description of the Related Art

A vehicle head-up display (HUD) that projects, using a windshield in a vehicle such as an automobile, a train, a ship, heavy equipment, an aircraft, or an agricultural machine, or a combiner disposed in the vicinity of the windshield as a screen, light onto the screen to display an image is known.

According to such an HUD, a driver can visually recognize an image based on light projected from the HUD as a real image on the screen, or as a virtual image in front of the screen.

As the above-mentioned vehicle HUD, an HUD capable of performing large screen display has been proposed (for example, see JP2013-148901A, JP2013-137355A, and JP2015-11212A).

JP2013-148901A discloses an HUD in which three projection units that project image light to a projection surface are disposed in a horizontal direction.

JP2013-137355A discloses an HUD in which two projection units that project image light to a projection surface are disposed in a horizontal direction.

JP2015-11212A discloses an HUD capable of dividing image light into two with respect to a projection surface in a vertical direction for projection.

SUMMARY OF THE INVENTION

In all the HUDs disclosed in JP2013-148901A, JP2013-137355A, and JP2015-11212A, since the shape of a projection range of image light is vertically long or horizontally wide, it is possible to present necessary information over a wide range.

However, according to usage forms of the HUDs, there is a case where display of information in a vertically wide range is more preferable than display of information in a horizontally wide range, and vice versa.

For example, according to countries, there is a case where the width or the position of a projection range in a vertical direction is restricted. Accordingly, in order to cope with vehicles in such a country, it is desirable that a horizontally wide projection range can be set. On the other hand, in countries where such restriction is not present, it is desirable to set either of a vertically wide projection range or a horizontally wide projection range.

Further, in an aircraft, a train, a bus, a truck, heavy equipment, a construction machine, or the like, there are many cases where a windshield is formed in a vertically long shape, and in these cases, movement of a sight line in a vertical direction is frequently performed. Accordingly, it is desirable to set a vertically wide projection range.

In this way, an optimal shape of a projection range may be determined according to usage forms. However, in a case where an HUD in which a plurality of projection units are arranged in a horizontal direction and an HUD in which a plurality of projection units are arranged in a vertical direction are separately made according to countries or kinds of vehicles, the manufacturing cost of the HUDs increases.

Further, even in a general automobile, there are a case where it is necessary to sufficiently secure a field of vision in a vertical direction and a case where it is not necessary to secure such a sufficient field of vision in the vertical direction, according to operating statuses. In addition, preferred shapes of projection ranges vary according to drivers.

In the HUDs disclosed in JP2013-148901A and JP2013-137355A, since the shape of the projection range is fixed, it is not possible to set the projection range to be suitable for driving situations, drivers' preferences, or the like.

The HUD disclosed in JP2015-11212A is able to change the shape of the projection range in the vertical direction, but in the HUD, it is not possible to set a horizontally wide projection range.

In this description, an HUD for a vehicle is exemplified, but the same problem may occur in an HUD for usage other than the vehicle.

The invention has been made in consideration of the above-mentioned problems, and an object of the invention is to provide a non-transitory recording medium readable by a computer for recording a projection type display device, a projection control method, and a projection control program capable of smoothly changing shapes of projection ranges of image light.

A projection type display device of the invention comprises: a plurality of projection units that project image light to a projection surface; a drive mechanism for controlling a position, on the projection surface, of a projection range of the image light projected by at least a part of the plurality of projection units; and a controller that controls the drive mechanism and changes a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively.

A projection control method of the invention comprises: a control step of controlling a drive mechanism for controlling a position, on a projection surface, of a projection range of image light projected by at least a part of a plurality of projection units that project the image light onto a projection surface to change a length, in one direction, of a range obtained by combining projection ranges of image light projected by the plurality of projection units and a length, in a direction orthogonal to the one direction, of the range obtained by combining the projection ranges of the image light projected by the plurality of projection units.

A non-transitory recording medium readable by a computer for recording a projection control program of the invention is a non-transitory recording medium readable by a computer for recording a program that causes a computer to execute: a control step of controlling a drive mechanism for controlling a position, on a projection surface, of a projection range of image light projected by at least a part of a plurality of projection units that project the image light onto a projection surface to change a length, in one direction, of a range obtained by combining projection ranges of image light projected by the plurality of projection units and a length, in a direction orthogonal to the one direction, of the range obtained by combining the projection ranges of the image light projected by the plurality of projection units, respectively.

According to the invention, it is possible to provide a projection type display device, a projection control method, and a non-transitory recording medium readable by a computer for recording a projection control program capable of smoothly changing shapes of projection ranges of image light.

BRIEF DESCRIPTION OF THE DRAWINGS

FIG. 5 is a schematic diagram when a projection state of image light in a lateral screen mode of the projection type display device 1 shown in FIG. 1 is seen in a direction Y.

FIG. 6 is a diagram showing a visual recognition range of a virtual image that is visually recognized by a driver in the projection state shown in FIG. 5.

FIG. 22 is a schematic diagram when a projection state of image light in the L-shaped screen mode of the projection type display device 1A shown in FIG. 18 is seen in the direction Y.

FIG. 23 is a diagram showing a visual recognition range of a virtual image from a driver in the projection state shown in FIG. 22.

DESCRIPTION OF THE PREFERRED EMBODIMENTS

Hereinafter, embodiments of the invention will be described with reference to the accompanying drawings.

First Embodiment

Figure 1:
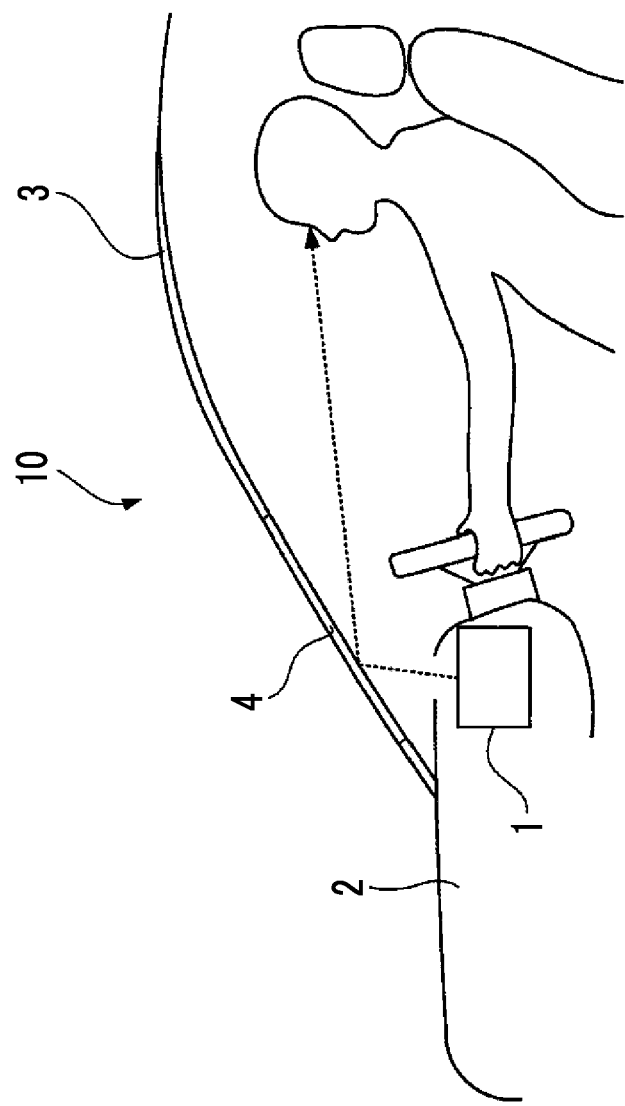
FIG. 1 is a schematic diagram showing a configuration of an automobile 10 in which a projection type display device 1 is mounted, according to a first embodiment of the invention.

FIG. 1 is a schematic diagram showing a configuration of an automobile 10 in which a projection type display device 1 is mounted, according to a first embodiment of the invention. The projection type display device 1 may be mounted in a vehicle such as a train, heavy equipment, a construction machine, an aircraft, a ship, or an agricultural machine, as well as the automobile 10.

As shown in FIG. 1, the projection type display device 1 is provided in a dashboard 2 of the automobile 10.

The projection type display device 1 projects image light onto a projection surface 4 that is a partial range of a windshield 3. The projection surface 4 is processed to reflect the image light projected from the projection type display device 1 toward the eyes of a driver.

Here, the projection type display device 1 is provided as a device that projects image light to the windshield 3, but may be configured to project image light to a combiner disposed in the vicinity of the windshield 3. In this case, the combiner forms a projection surface.

A driver may visually recognize content such as icons or characters relating to driving using a virtual image based on image light that is projected onto the projection surface 4 and is reflected from the projection surface 4. Further, the projection surface 4 has a function of transmitting light from the outside (outside a vehicle) of the windshield 3. Thus, the driver may visually recognize an image in which the virtual image based on the image light overlaps an outside scene.

Figure 2:
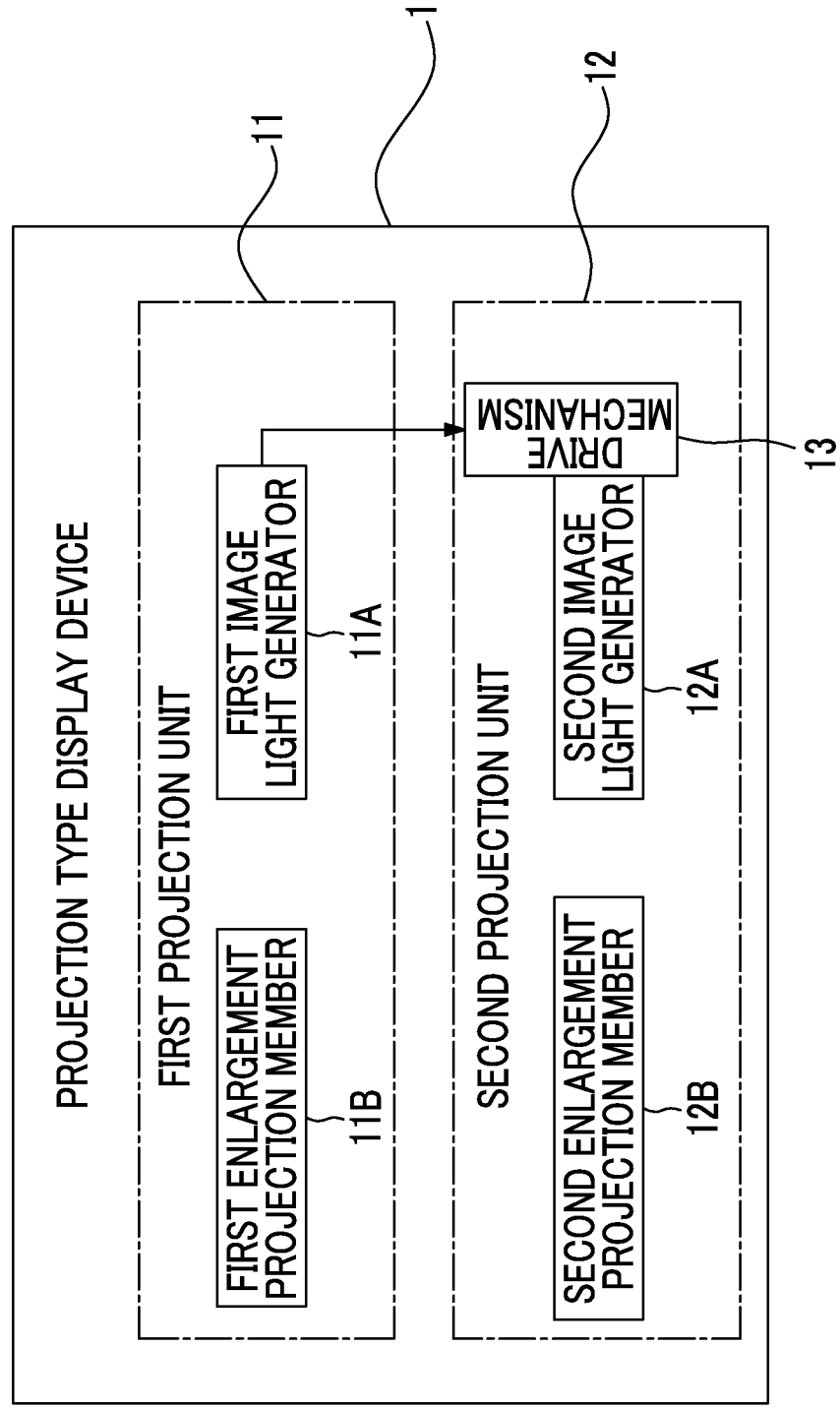
FIG. 2 is a schematic diagram showing a schematic configuration of the projection type display device 1 shown in FIG. 1.

FIG. 2 is a schematic diagram showing a schematic configuration of the projection type display device 1 shown in FIG. 1.

As shown in FIG. 2, the projection type display device 1 includes a first projection unit 11 that projects image light onto the projection surface 4 and a second projection unit 12 that projects image light onto the projection surface 4.

The first projection unit 11 includes a first image light generator 11A and a first enlargement projection member 11B.

The second projection unit 12 includes a second image light generator 12A, a second enlargement projection member 12B, and a drive mechanism 13.

Each of the first image light generator 11A and the second image light generator 12A has a light source, a light modulation element, an image light emitting member, and the like, and generates image light to be projected onto the projection surface 4.

Each of the first enlargement projection member 11B and the second enlargement projection member 12B enlarges image light generated by each of the first image light generator 11A and the second image light generator 12A, and projects the enlarged image light onto the projection surface 4.

The drive mechanism 13 is a mechanism for controlling the position, on the projection surface 4, of a projection range of image light projected from the second image light generator 12A of the second projection unit 12, which is a mechanism for changing the position of the second image light generator 12A. The drive mechanism 13 may also function as an optical path length control mechanism that controls the length of an optical path of image light.

Figure 3:
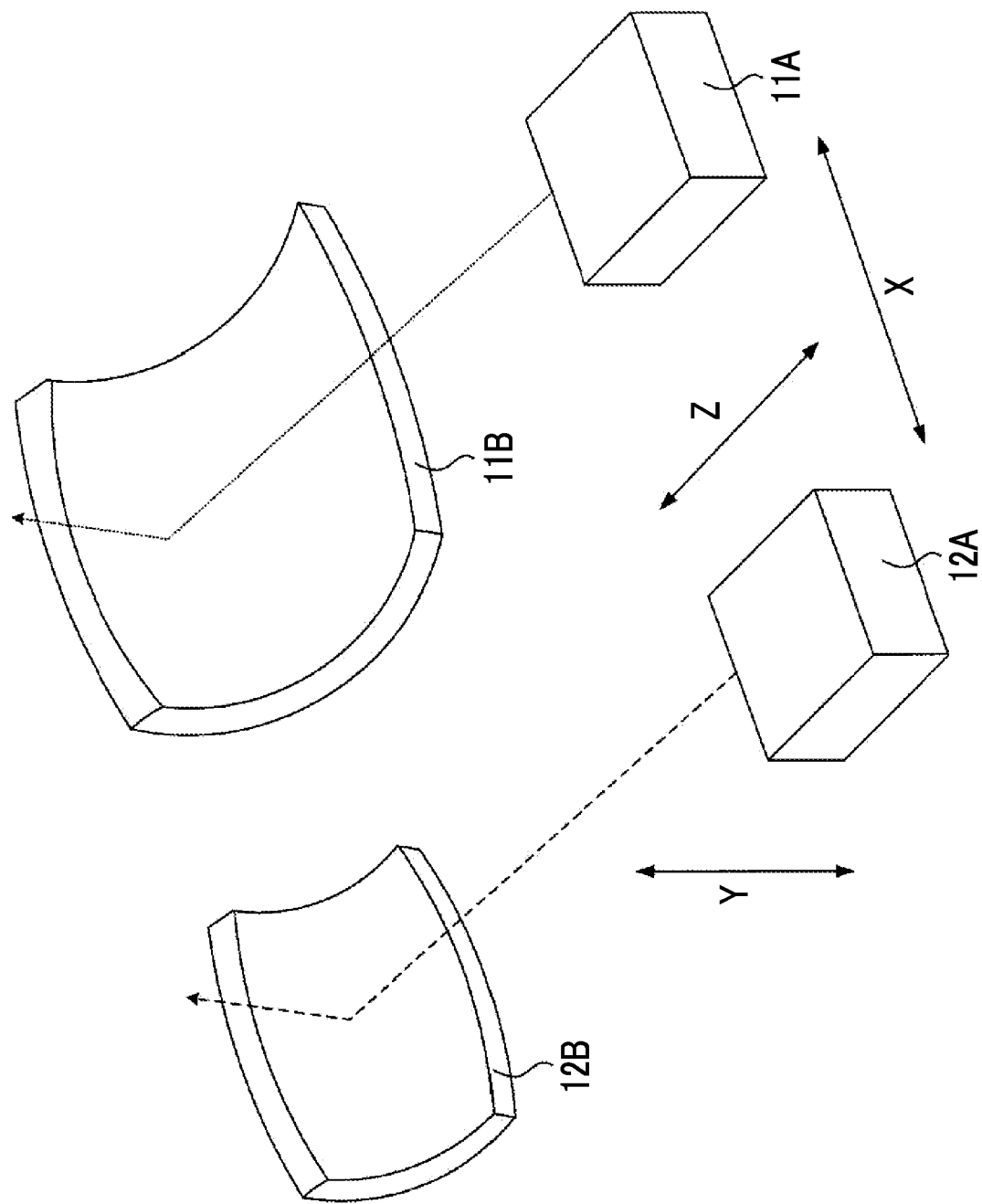
FIG. 3 is a schematic diagram showing an arrangement example of a first projection unit 11 and a second projection unit 12 shown in FIG. 2.

FIG. 3 is a schematic diagram showing an arrangement example of the first projection unit 11 and the second projection unit 12 shown in FIG. 2.

As shown in FIG. 3, the first image light generator 11A and the second image light generator 12A are arranged in a direction X that is a direction in which a driver's seat of the automobile 10 and a passenger's seat are arranged.

The first enlargement projection member 11B is disposed on an optical path of image light emitted from the first image light generator 11A.

The second enlargement projection member 12B is disposed on an optical path of image light emitted from the second image light generator 12A.

The first enlargement projection member 11B and the second enlargement projection member 12B are arranged in the direction X.

The first enlargement projection member 11B is a concave mirror in the example of FIG. 3, and enlarges incident image light and projects the enlarged image light onto the projection surface 4.

The second enlargement projection member 12B is a concave mirror in the example of FIG. 3, and enlarges image light emitted from the second image light generator 12A and projects the enlarged light onto the projection surface 4.

The first enlargement projection member 11B is configured to have the area of a light reflecting surface larger than that of the second enlargement projection member 12B.

The first enlargement projection member 11B and the second enlargement projection member 12B are not limited to the concave mirrors, and may be optical members capable of projecting image light onto the projection surface 4.

The second image light generator 12A is configured so that the position thereof in the direction X and the position thereof in each of directions Y and Z that are orthogonal to the direction X and are orthogonal to each other are changeable by the drive mechanism 13. The direction Y is a direction along the direction of gravity.

By controlling the drive mechanism 13, the projection type display device 1 may be switched from a state shown in FIG. 3 to a state where the position of the second image light generator 12A is moved to a lower side of the first image light generator 11A in the direction Y and image light emitted from the second image light generator 12A is incident onto the first enlargement projection member 11B.

In this way, the first enlargement projection member 11B is configured to have the area of the reflecting surface larger than that of the second enlargement projection member 12B to such a degree that image light emitted from the first image light generator 11A and image light emitted from the second image light generator 12A can be respectively enlarged to be projectable onto the projection surface 4.

Figure 4:
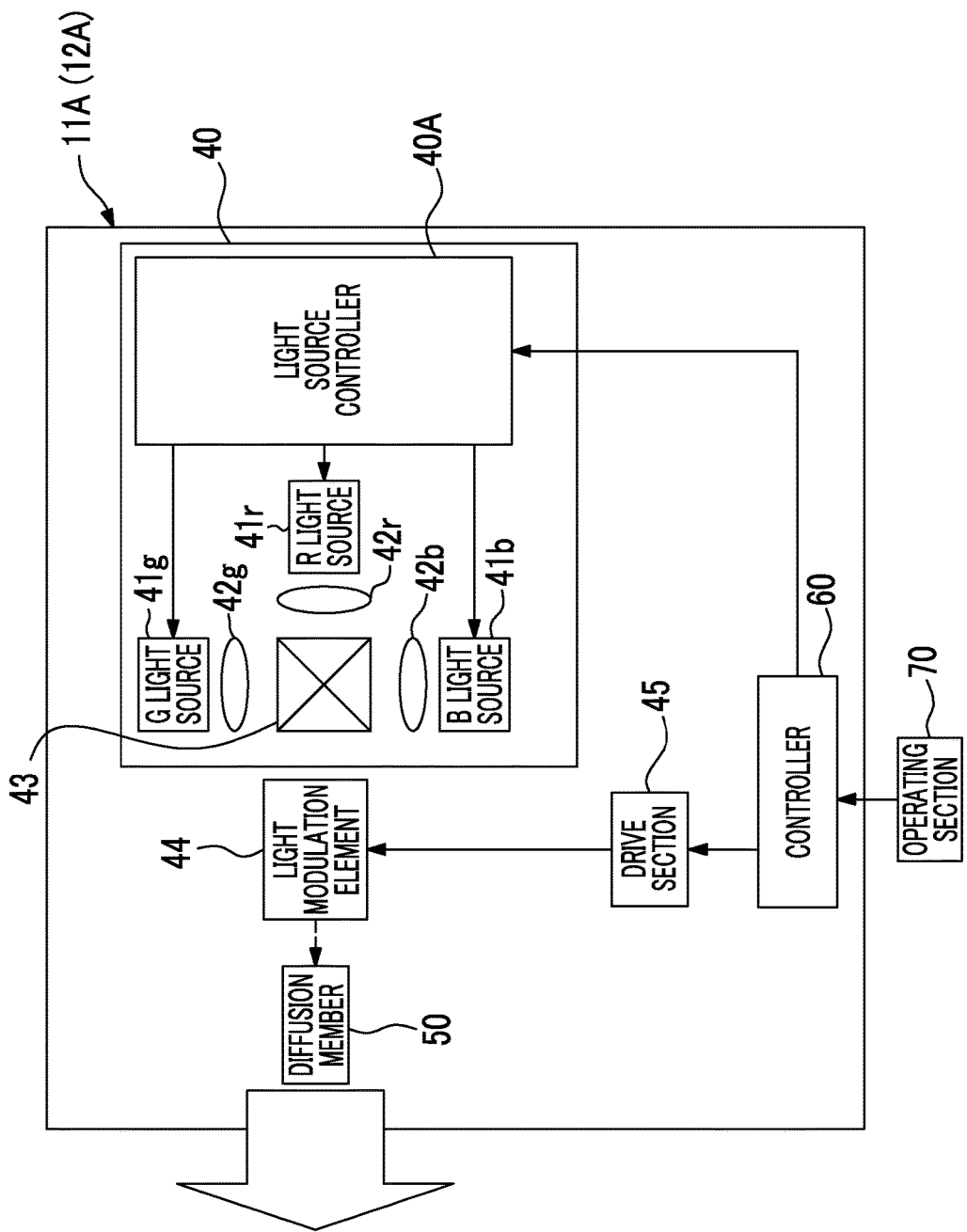
FIG. 4 is a diagram showing an example of an internal configuration of a first image light generator 11A shown in FIG. 2.

FIG. 4 is a diagram showing an example of an internal configuration of the first image light generator 11A shown in FIG. 2. Since the internal configuration of the second image light generator 12A shown in FIG. 2 is the same as in FIG. 2, description thereof will not be repeated.

The first image light generator 11A includes a light source unit 40, a light modulation element 44, a drive section 45 that drives the light modulation element 44, a diffusion member 50, and a controller 60.

The light source unit 40 includes a light source controller 40A, an R light source 41r that is a red light source that emits red light, a G light source 41g that is a green light source that emits green light, a B light source 41b that is a blue light source that emits blue light, a dichroic prism 43, a collimator lens 42r that is provided between the R light source 41r and the dichroic prism 43, a collimator lens 42g that is provided between the G light source 41g and the dichroic prism 43, and a collimator lens 42b that is provided between the B light source 41b and the dichroic prism 43. The R light source 41r, the G light source 41g, and the B light source 41b form the light source.

The dichroic prism 43 is an optical member for guiding light emitted from each of the R light source 41r, the G light source 41g, and the B light source 41b to the same optical path. The dichroic prism 43 transmits red light that is collimated by the collimator lens 42r to be output to the light modulation element 44.

Further, the dichroic prism 43 reflects green light that is collimated by the collimator lens 42g to be output to the light modulation element 44. Further, the dichroic prism 43 reflects blue light that is collimated by the collimator lens 42b to be output to the light modulation element 44.

An optical member having such a function for guiding light to the same optical path is not limited to a dichroic prism. For example, a cross dichroic mirror may be used.

The R light source 41r, the G light source 41g, and the B light source 41b may respectively employ a light emitting element such as a laser or a light emitting diode (LED).

The light sources of the respective projection units of the projection type display device 1 are not limited to the example of three light sources of the R light source 41r, the G light source 41g, and the B light source 41b, and may be configured of one light source or two light sources or four or more light sources that emit light in different wavelength ranges.

The light source controller 40A controls each of the R light source 41r, the G light source 41g, and the B light source 41b, and performs a control for emitting light from the R light source 41r, the G light source 41g, and the B light source 41b.

The light modulation element 44 spatially modulates light that is emitted from the R light source 41r, the G light source 41g, and the B light source 41b and then is emitted from the dichroic prism 43 on the basis of image data input from the controller 60.

The light modulation element 44 may employ, for example, a liquid crystal on silicon (LCOS), a digital micromirror device (DMD), a micro electro mechanical systems (MEMS) element, a liquid crystal display device, or the like.

The drive section 45 drives the light modulation element 44 on the basis of image data input from the controller 60, and causes image light (red color image light, blue color image light, and green color image light) based on the image data to be output to the diffusion member 50 from the light modulation element 44.

The diffusion member 50 is a member that diffuses image light that is spatially modulated by the light modulation element 44 to become plane light source. As the diffusion member 50, a micro-mirror array having a fine structure on its surface, a diffusion mirror, a reflecting holography diffuser, or the like may be used. The diffusion member 50 forms an image light emitting member.

The diffusion member 50 and the first enlargement projection member 11B (the second enlargement projection member 12B) are optically designed so that an image based on image light projected onto the projection surface 4 can be visually recognized by a driver as a virtual image at a position in front of the windshield 3. The optical design may be performed so that image based on image light can be visually recognized by a driver as a real image on the projection surface 4.

The controller 60 of the first image light generator 11A (the second image light generator 12A) controls the light source controller 40A and the drive section 45 to emit image light based on image data from the first image light generator 11A (the second image light generator 12A) to the first enlargement projection member 11B (the second enlargement projection member 12B).

Further, the controller 60 of the first image light generator 11A (the second image light generator 12A) controls the drive mechanism 13 on the basis of an operating signal from an operating section 70 provided in the projection type display device 1.

Using the control, it is possible to change the positions of the second image light generator 12A in the respective directions X, Y, and Z. A configuration in which the control of the drive mechanism 13 is performed by the controller 60 of the second image light generator 12A may be used.

The controller 60 that controls the drive mechanism 13 is configured of one processor or a plurality of processors that execute a projection control program stored in a non-transitory recording medium read only memory (ROM), and executes the projection control program to execute the control of the drive mechanism 13.

The operating section 70 is configured of physical operating buttons, a touch panel that belongs to a display mounted in the automobile 10, or the like, and serves as an interface for inputting a variety of information to the controller 60.

In the projection type display device 1, a plurality of display modes in which the length of a range (hereinafter, referred to as a combined projection range) obtained by combining a first projection range of image light projected onto the projection surface 4 by the first projection unit 11 and a second projection range of image light projected by the second projection unit 12, in the direction X that is one direction of the range, and the length thereof in the direction Y that is a direction orthogonal to the one direction respective vary may be set. The plurality of display modes may be set by operating the operating section 70.

In a production line, a configuration in which a display mode is set by a computer connected to the projection type display device 1 may be used. In this case, after the projection type display device 1 is shipped to a market, the display mode of the projection type display device 1 is fixed as a mode set in the production line, which cannot be changed by a driver.

The plurality of display modes include a lateral screen mode in which the length of the combined projection range in the direction X is longer than the length of the combined projection range in the direction Y, and a longitudinal screen mode in which the length of the combined projection range in the direction Y is longer than the length of the combined projection range in the direction X.

In the lateral screen mode, the controller 60 controls the drive mechanism 13 to move the second image light generator 12A to the position shown in FIG. 3. In this state, image light emitted from the second image light generator 12A is incident to the second enlargement projection member 12B.

In the longitudinal screen mode, the controller 60 controls the drive mechanism 13 to move the second image light generator 12A to a lower side of the first image light generator 11A in FIG. 3. In this state, image light emitted from the second image light generator 12A is incident to the first enlargement projection member 11B.

The controller 60 controls the drive mechanism 13 that performs switching between the modes on the basis of an operating signal input from the operating section 70.

In a case where the projection type display device 1 is a device capable of changing a display mode by a driver, the lateral screen mode is set in high speed traveling, for example. Further, the longitudinal screen mode is set in low speed traveling, for example.

Further, in a case where a display mode is set in a production line, in an aircraft, a bus, a train, a truck, heavy equipment, a construction machine, or the like, since the windshield 3 is formed in an elongated shape in a vertical direction and movement of a line of sight in the vertical direction is frequently performed, for example, the display mode is set to the longitudinal screen mode. In a general automobile, the display mode is set to the lateral screen mode, for example.

FIG. 5 is a schematic diagram when a projection state of image light in the lateral screen mode of the projection type display device 1 shown in FIG. 1 is seen in the direction Y.

As shown in FIG. 5, in the lateral screen mode, a first projection range 11C on the projection surface 4 of image light emitted from the first image light generator 11A and a second projection range 12C on the projection surface 4 of image light emitted from the second image light generator 12A are arranged in the direction X without a gap. Thus, a combined projection range is formed in a rectangular shape of which the direction X is a length direction.

In the lateral screen mode, the length of an optical path of image light that is emitted from the first image light generator 11A and is reflected from the first enlargement projection member 11B to reach the projection surface 4, and the length of an optical path of image light that is emitted from the second image light generator 12A and is reflected from the second enlargement projection member 12B to reach the projection surface 4 become equal to each other.

FIG. 6 is a diagram showing a visual recognition range of a virtual image that is visually recognized by a driver in the projection state shown in FIG. 5.

As shown in FIG. 6, a visual recognition range 101 of a virtual image that is a first image based on image light emitted from the first image light generator 11A and a visual recognition range 102 of a virtual image that is a second image based on image light emitted from the second image light generator 12A are arranged in the X direction X when seen from a driver. Each length direction of the visual recognition range 101 and the visual recognition range 102 is the direction X.

Further, a distance L between the driver and the virtual image that is visually recognized in the visual recognition range 101 in the direction Z and a distance L between the driver and the virtual image that is visually recognized in the visual recognition range 102 in the direction Z become equal to each other.

As described above, in a case where the display mode is set to the lateral screen mode, since the first projection range 11C and the second projection range 12C are arranged in the direction X by driving the second image light generator 12A by the drive mechanism 13, it is possible to widely set a projection range in the direction X.

Figure 7:
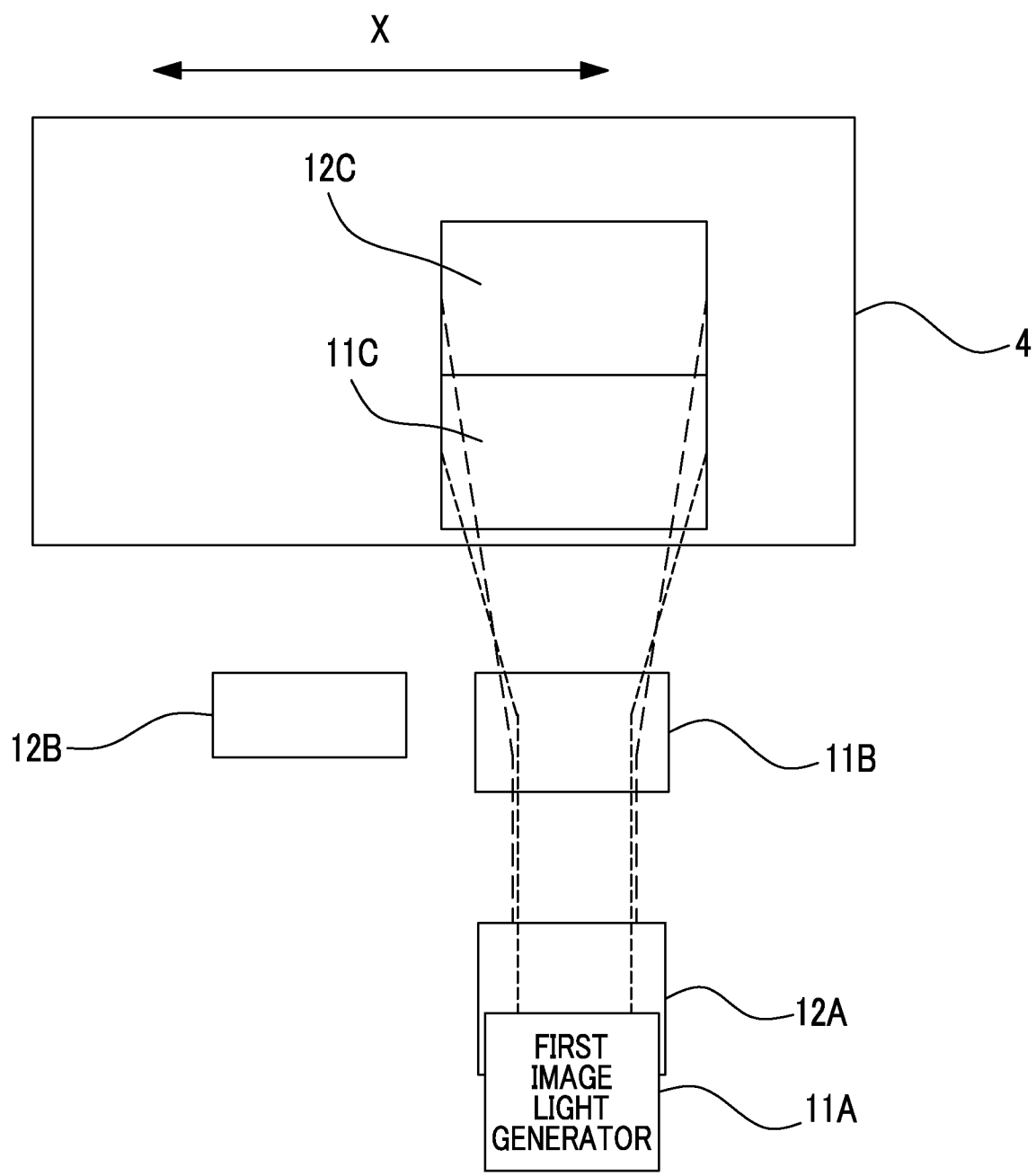
FIG. 7 is a schematic diagram when a projection state of image light in a longitudinal screen mode of the projection type display device 1 shown in FIG. 1 is seen in the direction Y.

FIG. 7 is a schematic diagram when a projection state of image light in the longitudinal screen mode of the projection type display device 1 shown in FIG. 1 is seen in the direction Y.

In FIG. 7, for ease of description, a state where sizes and light beams of the first image light generator 11A and the second image light generator 12A deviate from each other is shown as an example.

As shown in FIG. 7, in the longitudinal screen mode, the first projection range 11C on the projection surface 4 of image light emitted from the first image light generator 11A and the second projection range 12C on the projection surface 4 of image light emitted from the second image light generator 12A are arranged in the direction Y without a gap. Thus, a combined projection range is formed in a rectangular shape of which the direction Y is a length direction.

Figure 8:
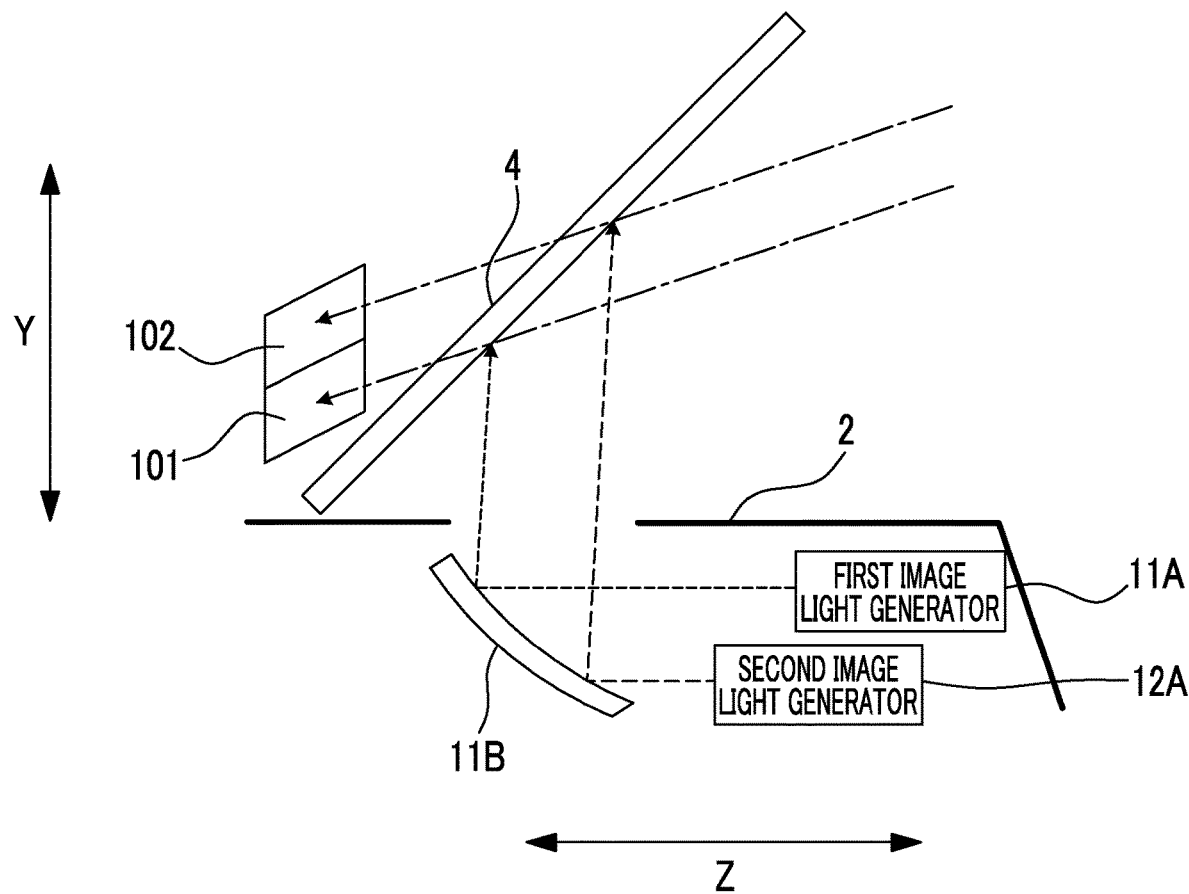
FIG. 8 is a schematic diagram when a projection state of image light in the longitudinal screen mode of the projection type display device 1 shown in FIG. 1 is seen in a direction X.

FIG. 8 is a schematic diagram when a projection state of image light in the longitudinal screen mode of the projection type display device 1 shown in FIG. 1 is seen in the direction X.

As shown in FIG. 8, in the longitudinal screen mode, the position of the second image light generator 12A in the direction Z is disposed to be close to the first enlargement projection member 11B with reference to the position of the first image light generator 11A in the direction Z.

Thus, the length of an optical path of the image light that is emitted from the first image light generator 11A and is reflected from the first enlargement projection member 11B to reach the projection surface 4, and the length of an optical path of the image light that is emitted from the second image light generator 12A and is reflected from the first enlargement projection member 11B to reach the projection surface 4 become equal to each other.

Figure 9:
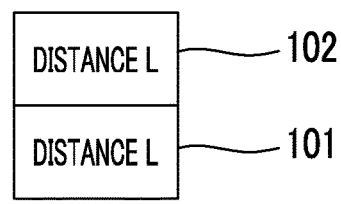
FIG. 9 is a diagram showing a visual recognition range of a virtual image that is visually recognized by a driver in the projection state shown in FIG. 8.

FIG. 9 is a diagram showing a visual recognition range of a virtual image that is visually recognized by a driver in the projection state shown in FIG. 8.

As shown in FIG. 9, a visual recognition range 101 of a virtual image based on image light emitted from the first image light generator 11A and a visual recognition range 102 of a virtual image based on image light emitted from the second image light generator 12A are arranged in the direction Y when seen from a driver.

Further, a distance L between the driver and the virtual image that is visually recognized in the visual recognition range 101 in the direction Z and a distance L between the driver and the virtual image that is visually recognized in the visual recognition range 102 in the direction Z become equal to each other.

As described above, in a case where the display mode is set to the longitudinal screen mode, since the first projection range 11C and the second projection range 12C are arranged in the direction Y by driving the second image light generator 12A by the drive mechanism 13, it is possible to widely set a projection range in the direction Y.

As described above, according to the projection type display device 1, it is possible to cause a driver to visually recognize a virtual image or a real image in either of the longitudinal screen mode or the lateral screen mode. Thus, it is possible to change a display mode according to a driver's preference, to thereby enhance an added value of the projection type display device 1.

Further, according to the projection type display device 1, it is possible to set the longitudinal screen mode or the lateral screen mode in a production line before shipping.

Thus, in a case where a projection type display device is shipped to countries having different restrictions, it is not necessary to manufacture a projection type display device having different specifications to overseas countries, and to reduce the manufacturing cost of the projection type display device 1.

In addition, according to the projection type display device 1, as the area of the first enlargement projection member 11B becomes large, it is possible to perform switching between the lateral screen mode and the longitudinal screen mode only by changing the position of the second image light generator 12A.

In this way, in the longitudinal screen mode, since the second image light generator 12A performs projection of image light using the first enlargement projection member 11B, it is possible to simplify the configuration of the drive mechanism 13, to thereby reduce the manufacturing cost. Further, it is also possible to achieve miniaturization of the device.

The projection type display device 1 has a configuration in which a distance to a virtual image based on image light emitted from the first image light generator 11A and a distance to a virtual image based on image light emitted from the second image light generator 12A become equal to each other, as shown in FIG. 6 and FIG. 9, but may employ a configuration in which there is a difference between the two distances.

Figure 10:
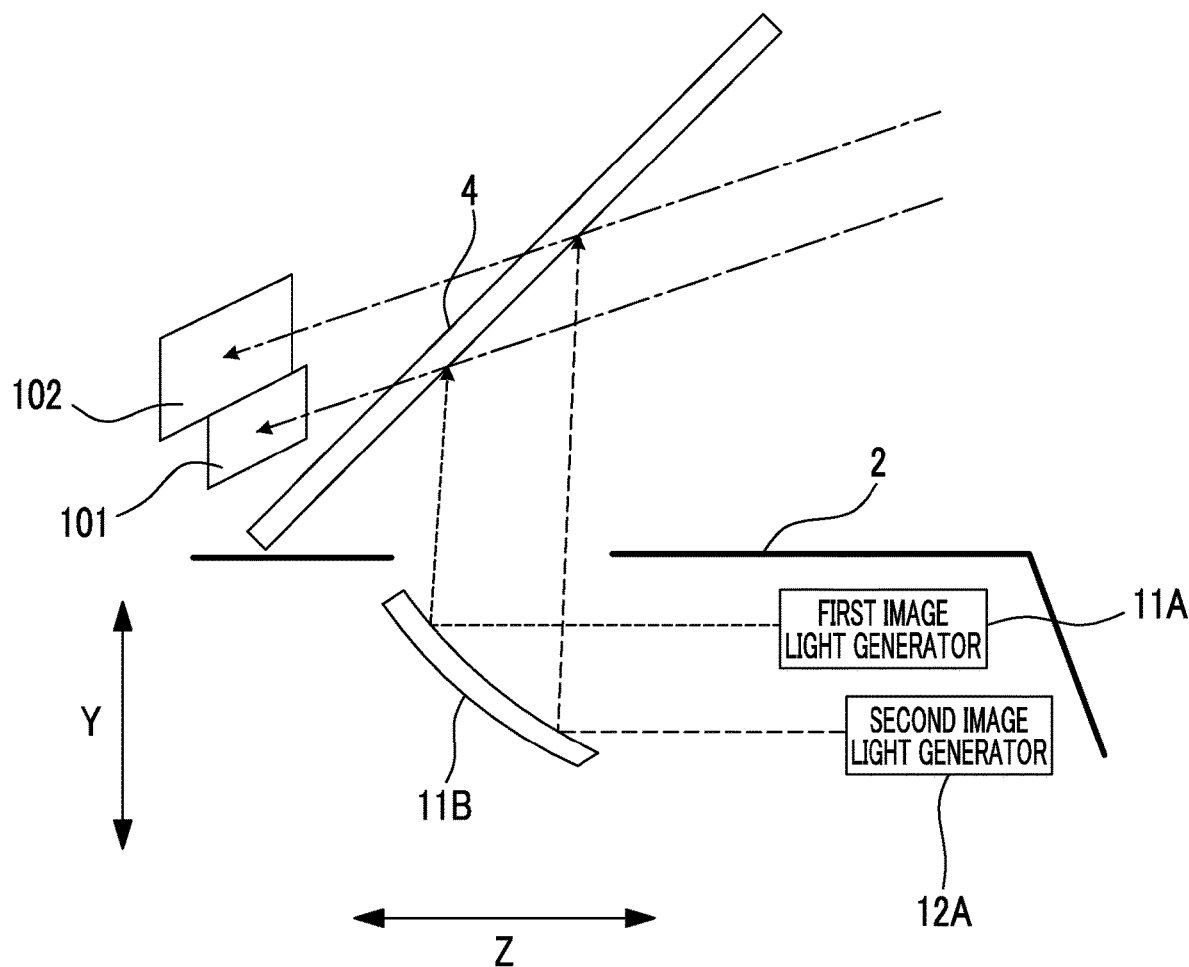
FIG. 10 is a diagram showing a first modification example of a projection state of image light in the longitudinal screen mode of the projection type display device 1 shown in FIG. 1, which is a schematic diagram when the projection state is seen in the direction X.
Figure 11:
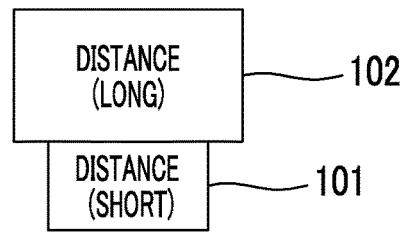
FIG. 11 is a diagram showing a visual recognition range of a virtual image from a driver in the projection state shown in FIG. 10.

FIG. 10 is a diagram showing a first modification example of a projection state of image light in the longitudinal screen mode of the projection type display device 1 shown in FIG. 1, which is a schematic diagram when the projection state is seen in the direction X. FIG. 11 is a diagram showing a visual recognition range of a virtual image from a driver in the projection state shown in FIG. 10.

In the example shown in FIG. 10, design of the first enlargement projection member 11B and the position of the second image light generator 12A are determined so that the length of an optical path of image light that is emitted from the second image light generator 12A and is reflected from the first enlargement projection member 11B to reach the projection surface 4 is set to be longer than the length of an optical path of image light that is emitted from the first image light generator 11A and is reflected from the first enlargement projection member 11B to reach the projection surface 4.

Thus, a distance between a virtual image based on the image light emitted from the second image light generator 12A and a driver in the direction Z becomes longer than a distance between a virtual image based on the image light emitted from the first image light generator 11A and the driver in the direction Z.

In the lateral screen mode, by moving the position of the second image light generator 12A in the direction Z from the state shown in FIG. 3 by the drive mechanism 13, it is possible to provide a difference between the distances of a visual recognition range 101 and a visual recognition range 102.

By setting the length of the optical path of the image light emitted from the second image light generator 12A to be longer than the length of the optical path of the image light emitted from the first image light generator 11A, it is possible to display various displays using two virtual images with a far and near difference, to thereby enhance display performance.

Figure 12:
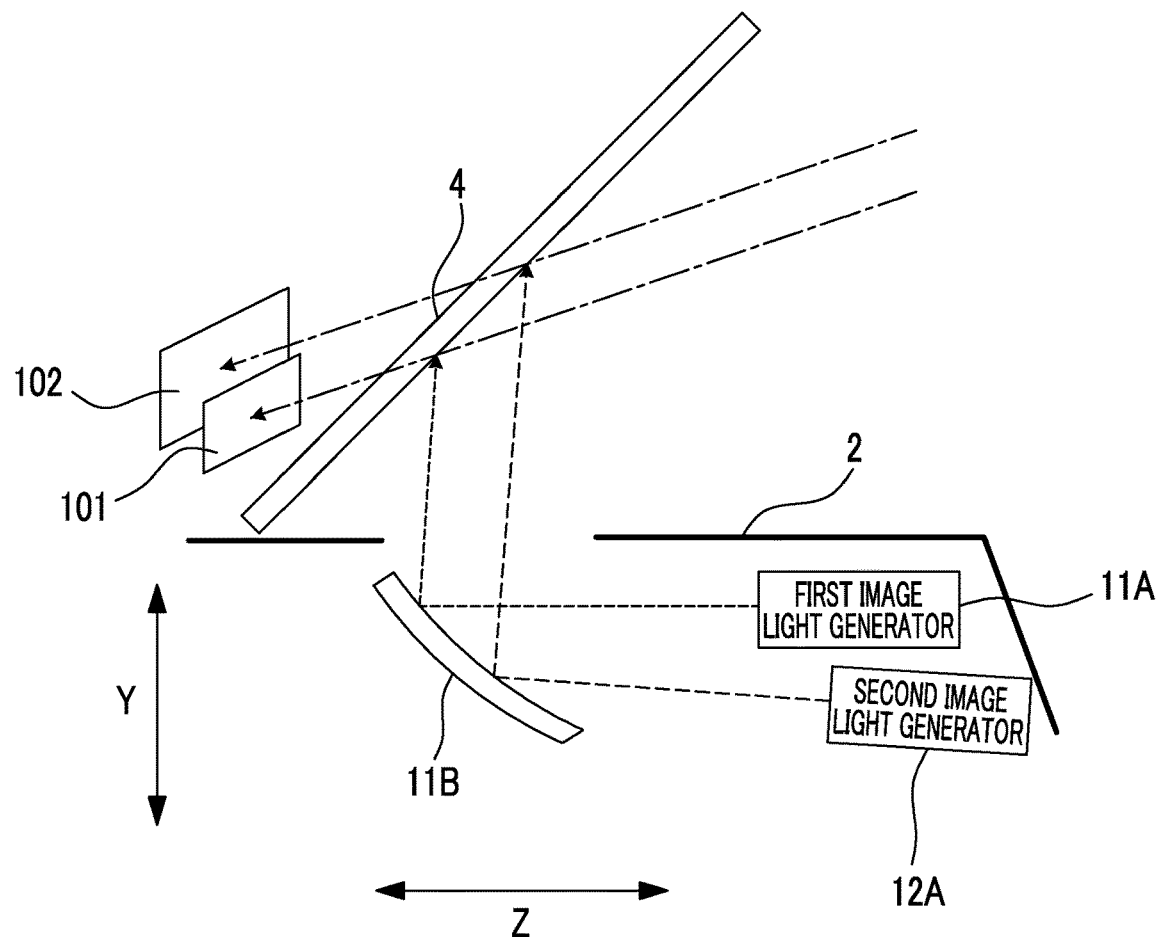
FIG. 12 is a diagram showing a second modification example of a projection state of image light in the longitudinal screen mode of the projection type display device 1 shown in FIG. 1, which is a schematic diagram when the projection state is seen in the direction X.

FIG. 12 is a diagram showing a second modification example of a projection state of image light in the longitudinal screen mode of the projection type display device 1 shown in FIG. 1, which is a schematic diagram when the projection state is seen in the direction X.

Figure 13A:
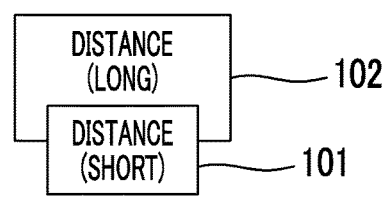
FIGS. 13A and 13B are diagrams showing visual recognition ranges of virtual images from a driver in the projection state shown in FIG. 12.
Figure 13B:
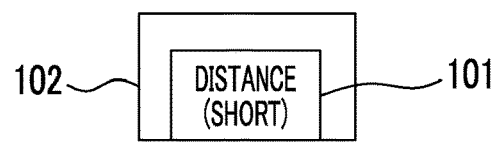

FIGS. 13A and 13B are diagrams showing visual recognition ranges of virtual images from a driver in the projection state shown in FIG. 12.

In the example shown in FIG. 12, the second image light generator 12A is configured to be rotatable around an axis that extends in the direction X. Further, the drive mechanism 13 may has a function for rotating the second image light generator 12A around the axis.

In the example shown in FIG. 12, the design of the first enlargement projection member 11B and the position of the second image light generator 12A in the direction Z are determined so that the length of an optical path of image light that is emitted from the first image light generator 11A and is reflected from the second enlargement projection member 12B to reach the projection surface 4 is set to be longer than the length of an optical path of image light that is emitted from the first image light generator 11A and is reflected from the first enlargement projection member 11B to reach the projection surface 4, The second image light generator 12A is rotated around the direction X by the drive mechanism 13 and the positions of the visual recognition ranges 101 and 102 of two virtual images in the direction Y are changed compared with FIG. 10.

Thus, a distance between a visual recognition range 102 and a driver becomes longer than a distance between a visual recognition range 101 and the driver, and at least parts of the visual recognition range 101 and the visual recognition range 102 overlap each other.

As shown in FIG. 13A, the visual recognition range 101 and the visual recognition range 102 are arranged in the direction Y when seen from the driver, but the visual recognition range 102 is disposed at a position that is more distant than that of the visual recognition range 101. Further, parts of the visual recognition range 101 and the visual recognition range 102 overlap each other in the direction Y.

FIG. 13B is a diagram showing a state where the second image light generator 12A is rotated around the axis along the direction X from the state shown in FIG. 13A. In the example shown in FIG. 13B, the visual recognition range 101 and the visual recognition range 102 completely overlap each other.

In the lateral screen mode, by rotating the second image light generator 12A around the axis along the direction X from the state shown in FIG. 3 by the drive mechanism 13, it is possible to provide a difference between positions of the visual recognition range 101 the visual recognition range 102 in the direction Y.

By rotating the second image light generator 12A around the axis along the direction X to change the positions of the visual recognition ranges of two virtual images in the direction Y, it is possible to achieve various displays, to thereby enhance display performance.

Figure 14:
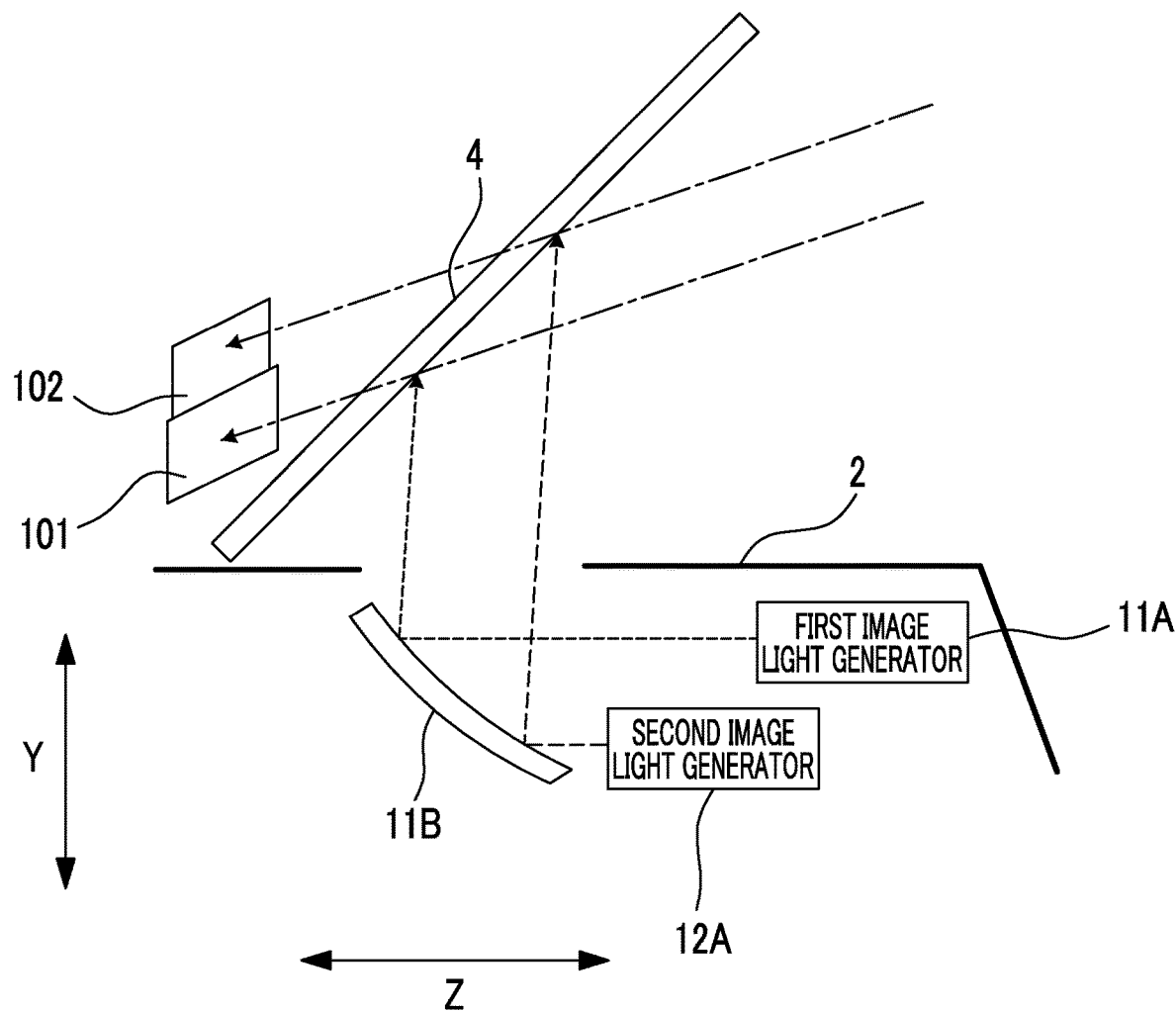
FIG. 14 is a diagram showing a third modification example of a projection state of image light in the longitudinal screen mode of the projection type display device 1 shown in FIG. 1, which is a schematic diagram when the projection state is seen in the direction X.

FIG. 14 is a diagram showing a third modification example of a projection state of image light in the longitudinal screen mode of the projection type display device 1 shown in FIG. 1, which is a schematic diagram when the projection state is seen in the direction X.

Figure 15:
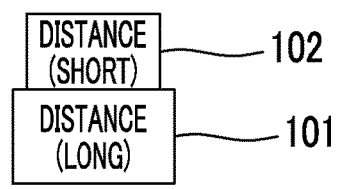
FIG. 15 is a diagram showing a visual recognition range of a virtual image from a driver in the projection state shown in FIG. 14.

FIG. 15 is a diagram showing a visual recognition range of a virtual image from a driver in the projection state shown in FIG. 14.

The modification example shown in FIG. 14 is different from that of FIG. 10 in that the second image light generator 12A moves in a direction where the second image light generator 12A is close to the first enlargement projection member 11B.

In the example shown in FIG. 14, the length of an optical path of image light that is emitted from the second image light generator 12A and is reflected from the first enlargement projection member 11B to reach the projection surface 4 is set to be shorter than the length of an optical path of image light that is emitted from the first image light generator 11A and is reflected from the first enlargement projection member 11B to reach the projection surface 4.

Thus, as shown in FIG. 15, a visual recognition range 101 and the visual recognition range 102 are arranged in the direction Y when seen from a driver, but the visual recognition range 102 is disposed to be close to the driver with reference to the visual recognition range 101.

In the lateral screen mode, similarly, by moving the position of the second image light generator 12A in the direction Z from the state shown in FIG. 3 by the drive mechanism 13, it is possible to provide a difference between the distances of the visual recognition range 101 and the visual recognition range 102.

in this way, by setting the length of the optical path of the image light that is emitted from the second image light generator 12A to be shorter than the length of the optical path of the image light that is emitted from the first image light generator 11A, it is possible to achieve various displays using two virtual images with a far and near difference, to thereby enhance display performance.

Figure 16:
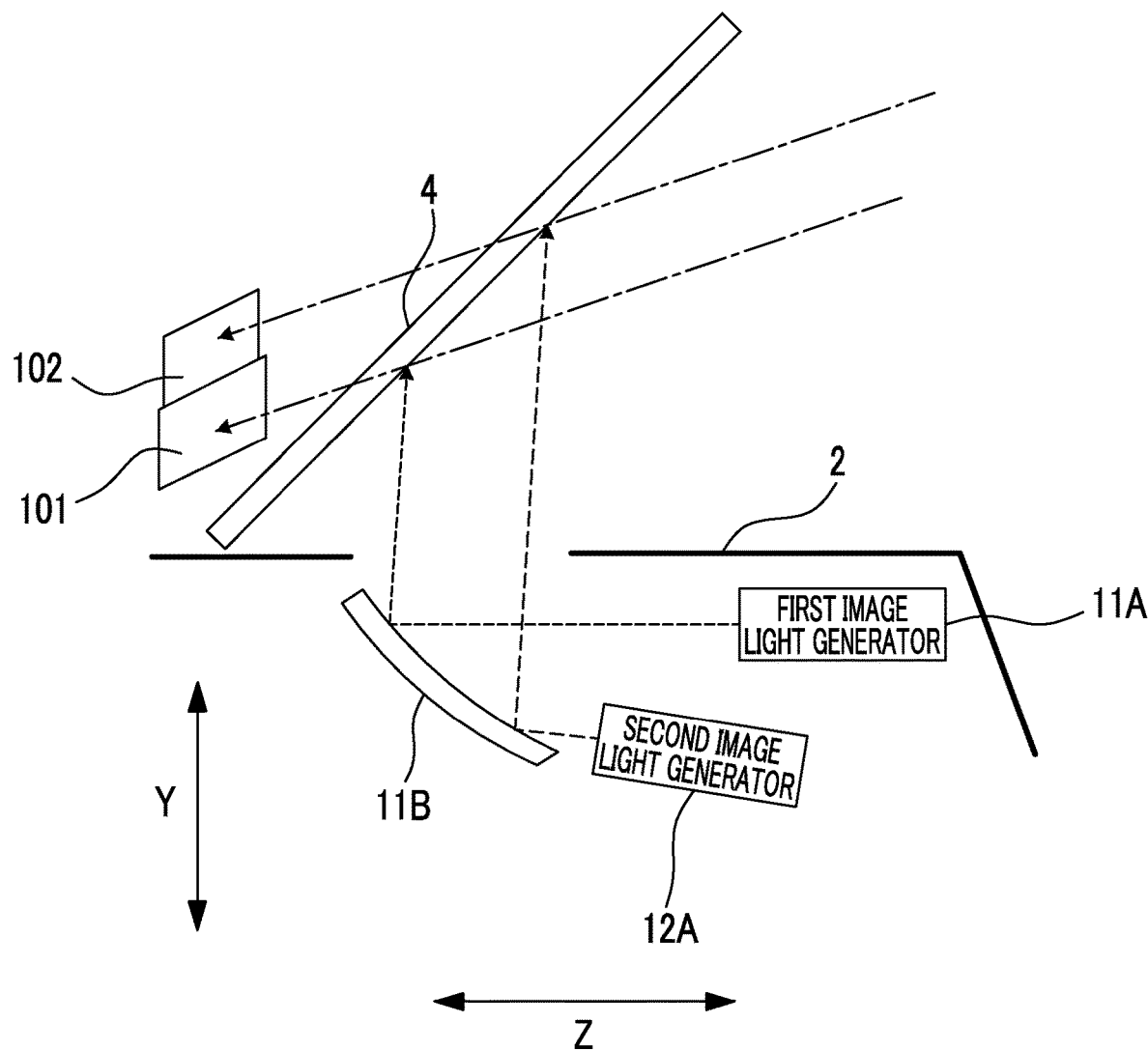
FIG. 16 is a diagram showing a fourth modification example of a projection state of image light in the longitudinal screen mode of the projection type display device 1 shown in FIG. 1, which is a schematic diagram when the projection state is seen in the direction X.

FIG. 16 is a diagram showing a fourth modification example of a projection state of image light in the longitudinal screen mode of the projection type display device 1 shown in FIG. 1, which is a schematic diagram when the projection state is seen in the direction X.

Figure 17:
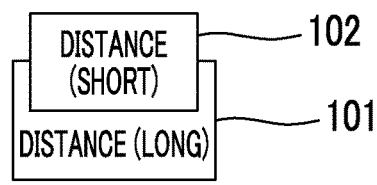
FIG. 17 is a diagram showing a visual recognition range of a virtual image from a driver in the projection state shown in FIG. 16.

FIG. 17 is a diagram showing a visual recognition range of a virtual image from a driver in the projection state shown in FIG. 16.

In the modification example shown in FIG. 16, the second image light generator 12A is configured to be rotatable around an axis that extends in the direction X. Further, the drive mechanism 13 also has a function of rotating the second image light generator 12A around the axis.

The modification example shown in FIG. 16 is different from that shown in FIG. 14 in that the second image light generator 12A is rotated around the axis along the direction X.

In the modification example shown in FIG. 16, the length of an optical path of image light that is emitted from the second image light generator 12A and is reflected from the first enlargement projection member 11B to reach the projection surface 4 is set to be shorter than the length of an optical path of image light that is emitted from the first image light generator 11A and is reflected from the first enlargement projection member 11B to reach the projection surface 4. Further, the second image light generator 12A is rotated around the axis along the direction X.

Thus, as shown in FIG. 17, a visual recognition range 101 and a visual recognition range 102 are arranged in the direction Y when seen from a driver, but the visual recognition range 102 is disposed to be close to the driver with reference to the visual recognition range 101. Further, the visual recognition range 101 and the visual recognition range 102 overlap each other.

In the lateral screen mode, by moving the second image light generator 12A to be close to the first enlargement projection member 11B and rotating the second image light generator 12A around the axis along the direction X from the state shown in FIG. 3 by the drive mechanism 13, it is possible to provide a difference between the positions of the visual recognition range 101 and the visual recognition range 102 in the direction Y and the distances thereof in the direction Z, respectively.

By setting the length of an optical path of image light that is emitted from the second image light generator 12A to be shorter than the length of an optical path of image light that is emitted from the first image light generator 11A and controlling the position of the visual recognition range 102 in the direction Y, it is possible to achieve various displays using two virtual images with a far and near difference, to thereby enhance display performance.

In the examples shown in FIGS. 10 to 17, a configuration in which, using a mechanism that moves the first image light generator 11A instead of the second image light generator 12A in the direction Z or moves each of the first image light generator 11A and the second image light generator 12A in the direction Z, a difference between the length of an optical path of image light emitted from the first image light generator 11A and the length of an optical path of image light emitted from the second image light generator 12A is formed, may be used.

In the projection type display device 1, a drive mechanism for moving the first projection unit 11 in the direction X may be additionally provided.

In this case, in the longitudinal screen mode, the controller 60 controls the drive mechanism to cause the first projection unit 11 to deviate toward the second projection unit 12.

Further, the controller 60 controls the drive mechanism 13 to move the second image light generator 12A to a lower side of the first image light generator 11A of which the position is changed by the drive mechanism to realize the projection state shown in FIG. 7.

Second Embodiment

Figure 18:
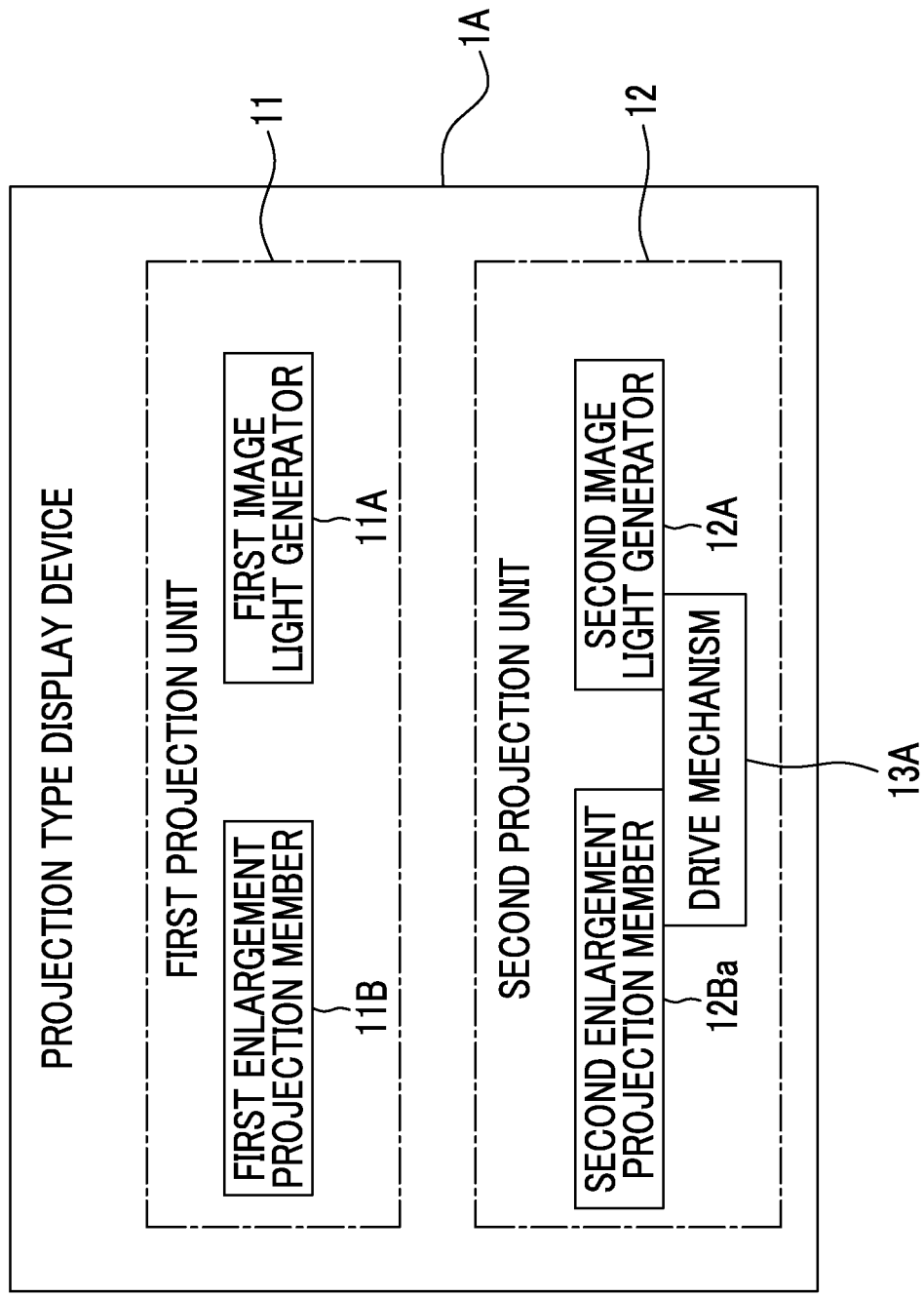
FIG. 18 is a diagram showing a schematic configuration of a projection type display device 1A that is a second embodiment of the invention.

FIG. 18 is a diagram showing a schematic configuration of a projection type display device 1A that is a second embodiment of the invention. In FIG. 18, the same reference numerals are given to the same configurations in FIG. 2, and description thereof will not be repeated.

The projection type display device 1A has the same configuration as in the projection type display device 1 except that the drive mechanism 13 is changed to a drive mechanism 13A and the second enlargement projection member 12B is changed to a second enlargement projection member 12Ba. The second enlargement projection member 12Ba has the same configuration as in the first enlargement projection member 11B.

The projection type display device 1A may set two display modes of a lateral screen mode and an L-shaped screen mode as a plurality of display modes. The L-shaped screen mode refers to a display mode in which the shape of a combined projection range is an "L" shape.

The drive mechanism 13A is a mechanism for controlling the position on the projection surface 4 of a projection range of image light projected from the second projection unit 12. The drive mechanism 13A is controlled by the controller 60 of the first projection unit 11 or the second projection unit 12.

The controller 60 that controls the drive mechanism 13A is configured of one processor or a plurality of processors that execute a projection control program stored in a non-transitory recording medium read only memory (ROM), and executes the projection control program to execute the control of the drive mechanism 13A.

Figure 19:
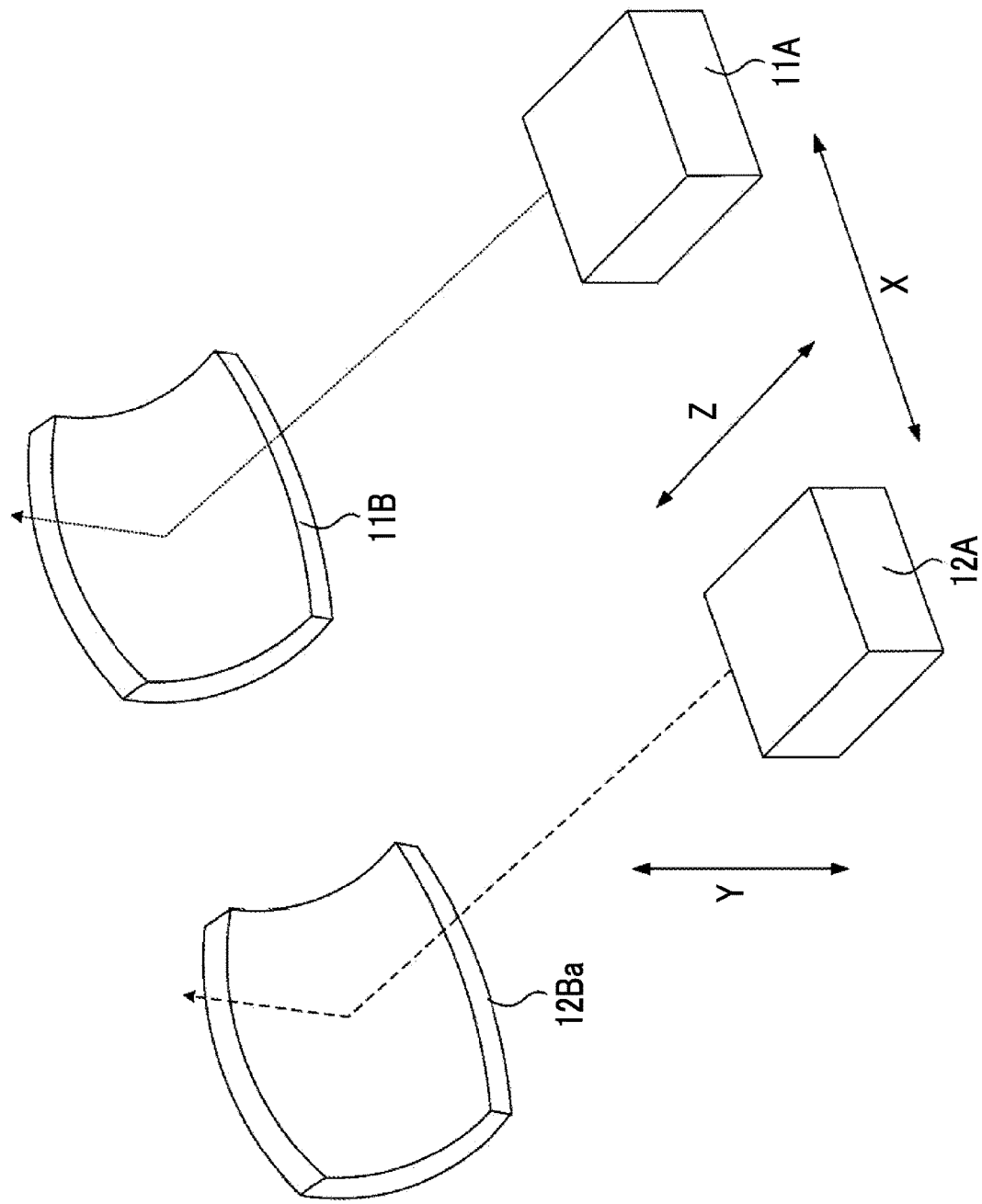
FIG. 19 is a schematic diagram showing an arrangement example of a first projection unit 11 and a second projection unit 12 of the projection type display device 1A shown in FIG. 18.

FIG. 19 is a schematic diagram showing an arrangement example of the first projection unit 11 and the second projection unit 12 in the lateral screen mode of the projection type display device 1A shown in FIG. 18.

A difference between FIG. 3 and FIG. 19 is in that the same member as the first enlargement projection member 11B is used as the second enlargement projection member 12Ba.

The drive mechanism 13A is a mechanism for moving the second projection unit 12 including the second enlargement projection member 12Ba and the second image light generator 12A in the direction X and rotating the second projection unit 12 by an angle of 90° around an axis along the direction Z.

Figure 20:
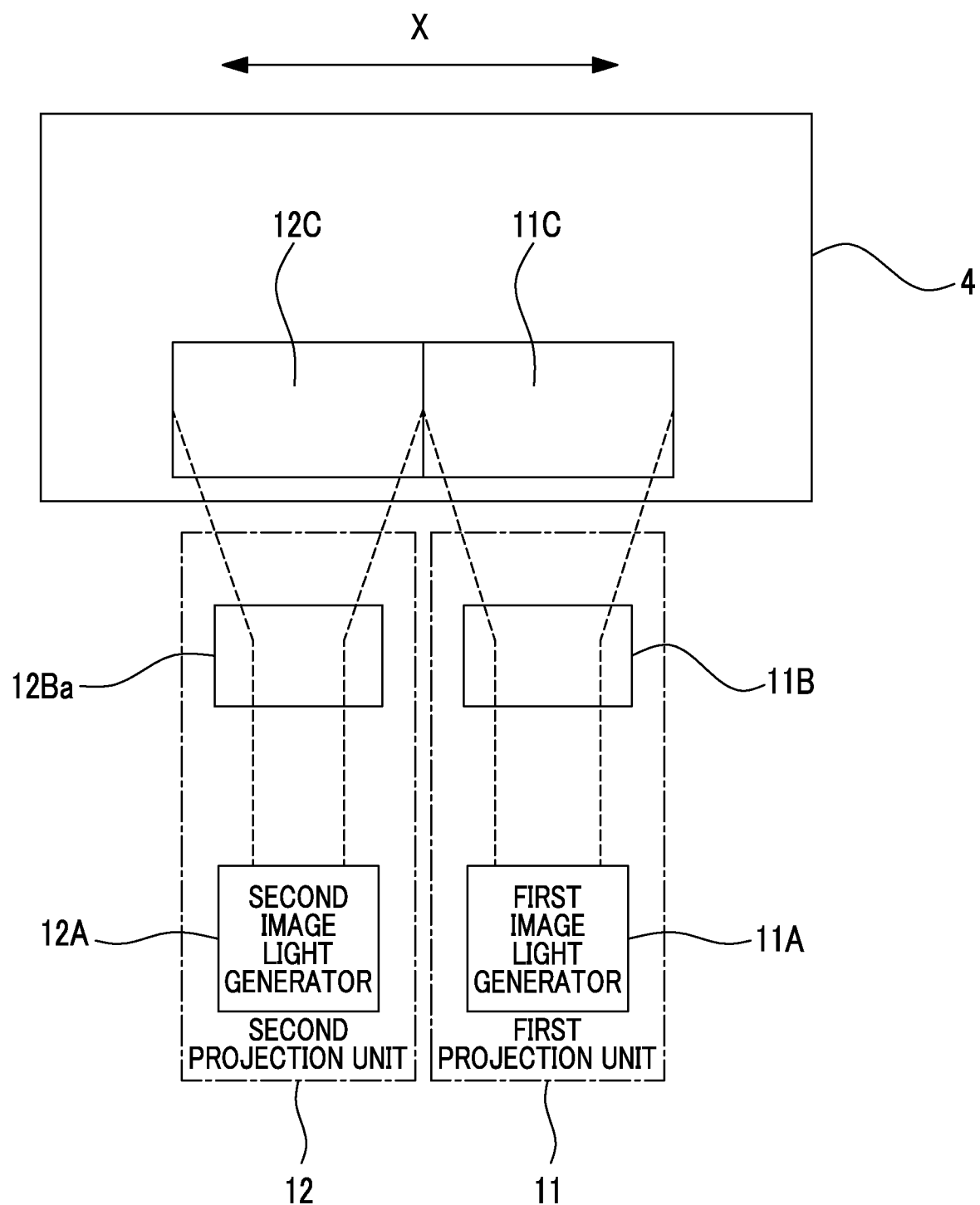
FIG. 20 is a schematic diagram when a projection state of image light in a lateral screen mode of the projection type display device 1A shown in FIG. 18 is seen in the direction Y.

FIG. 20 is a schematic diagram when a projection state of image light in the lateral screen mode of the projection type display device 1A shown in FIG. 18 is seen in the direction Y.

As shown in FIG. 20, in the lateral screen mode, a first projection range 11C on the projection surface 4 of image light emitted from the first image light generator 11A and a second projection range 12C on the projection surface 4 of image light emitted from the second image light generator 12A are arranged in the direction X without a gap.

Each of the first projection range 11C and the second projection range 12C is formed in a rectangular shape of which the direction X becomes a length direction. Thus, a combined projection range is formed in a rectangular shape of which the direction X is a length direction.

In the lateral screen mode, the length of an optical path of image light that is emitted from the first image light generator 11A and is reflected from the first enlargement projection member 11B to reach the projection surface 4 and the length of an optical path of image light that is emitted from the second image light generator 12A and is reflected from the second enlargement projection member 12B to reach the projection surface 4 become equal to each other.

A diagram showing a visual recognition range of a virtual image that is visually recognized by a driver in the projection state shown in FIG. 20 is the same as in FIG. 6.

Figure 21:
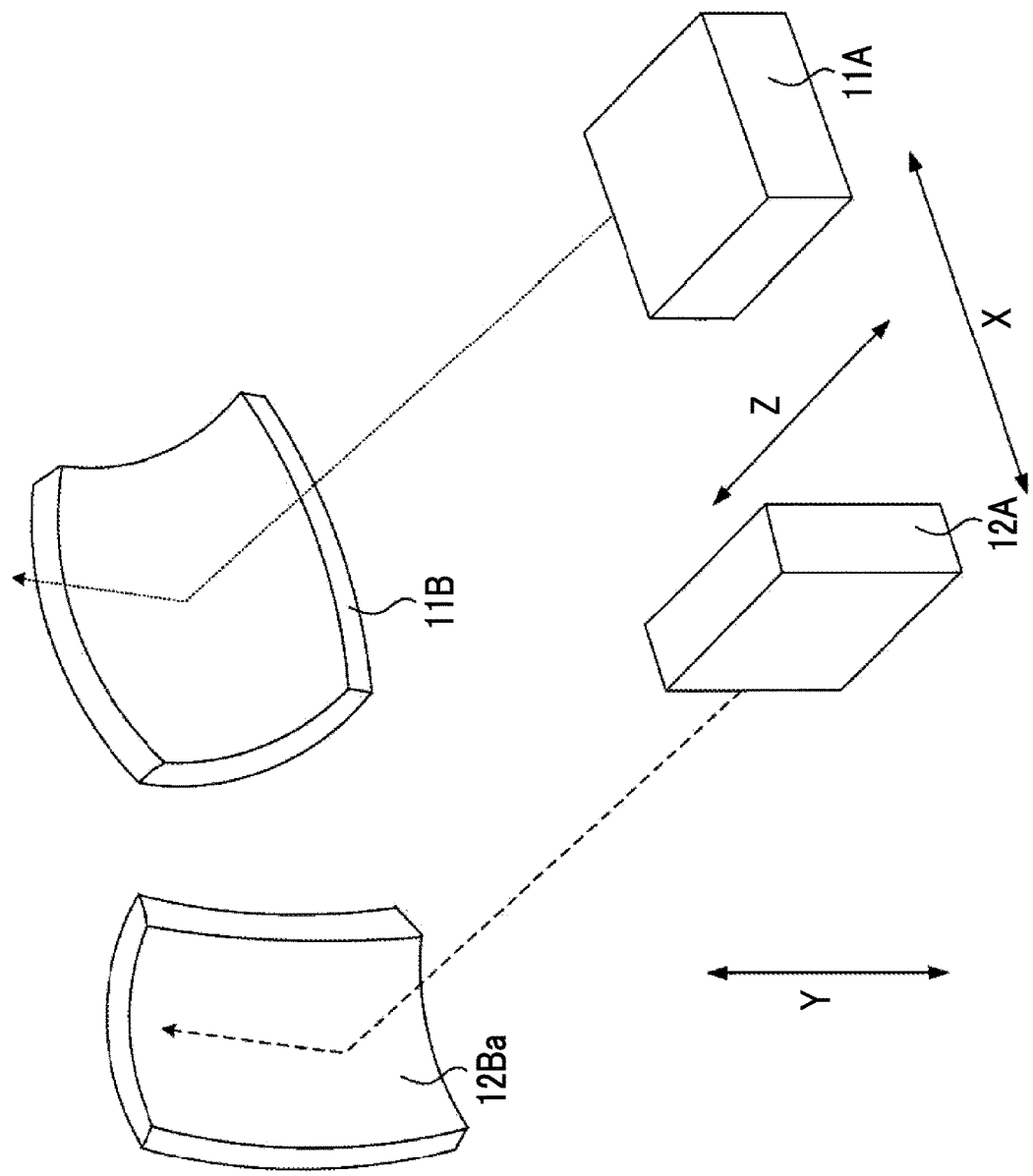
FIG. 21 is a schematic diagram showing an arrangement example of the first projection unit 11 and the second projection unit 12 in an L-shaped screen mode of the projection type display device 1A shown in FIG. 18.

FIG. 21 is a schematic diagram showing an arrangement example of the first projection unit 11 and the second projection unit 12 in the L-shaped screen mode of the projection type display device 1A shown in FIG. 18.

As shown in FIG. 21, in the L-shaped screen mode, the second projection unit 12 is rotated by an angle of 90° around an axis along an emission direction (direction Z) of image light projected from the second projection unit 12 from the state shown in FIG. 20, and the second projection unit 12 is moved to be close to the first projection unit 11 in the direction X.

FIG. 22 is a schematic diagram when a projection state of image light in the L-shaped screen mode of the projection type display device 1A shown in FIG. 18 is seen in the direction Y.

In the L-shaped screen mode, the length of an optical path of image light emitted from the first image light generator 11A and is reflected from the first enlargement projection member 11B to reach the projection surface 4 and the length of an optical path of image light emitted from the second image light generator 12A and is reflected from the first enlargement projection member 11B to reach the projection surface 4 become equal to each other.

As shown in FIG. 22, the first projection range 11C of the image light emitted from the first projection unit 11 is formed in a rectangular shape of which the direction X is a length direction. Further, the second projection range 12C of the image light emitted from the second projection unit 12 is formed in a rectangular shape of which the direction Y is a length direction. The first projection range 11C and the second projection range 12C are arranged in the direction X without a gap.

FIG. 23 is a diagram showing a visual recognition range of a virtual image from a driver in the projection state shown in FIG. 22.

As shown in FIG. 23, a visual recognition range 101 of a virtual image based on image light projected from the first projection unit 11 and a visual recognition range 102 of a virtual image based on image light projected from the second projection unit 12 are arranged in the direction X when seen from a driver, and a length direction of the visual recognition range 101 and a width direction of the visual recognition range 102 match each other. Further, distances from the driver of the visual recognition range 101 and the visual recognition range 102 become equal to each other.

As described above, according to the projection type display device 1A, by rotating the second projection unit 12 by the drive mechanism 13A, it is possible to perform switching between the lateral screen mode and the L-shaped screen mode. Thus, it is possible to obtain the same effects as in the projection type display device 1.

Further, according to the projection type display device 1A, it is possible to employ the same configuration in the first enlargement projection member 11B and the second enlargement projection member 12Ba. Thus, it is possible to reduce the manufacturing cost of the device through usage of common parts.

In addition, in the projection type display device 1A, it is possible to control the position of the second projection unit 12 in the direction X by the drive mechanism 13A.

Figure 24:
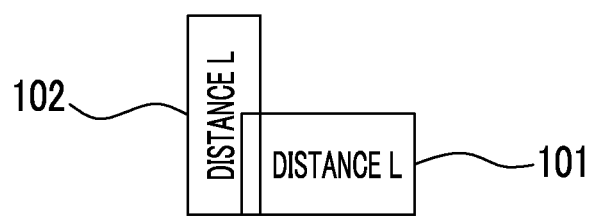
FIG. 24 is a diagram showing a modification example of a visual recognition range of a virtual image in the L-shaped screen mode of the projection type display device 1A shown in FIG. 18.

Thus, by moving the second projection unit 12 to be closer to the first projection unit 11 from the state shown in FIG. 22, it is possible to realize a state where the visual recognition range 101 and the visual recognition range 102 overlap each other, as shown in FIG. 24. Thus, it is possible to achieve various displays, to thereby enhance display performance.

Further, in the projection type display device 1A, the second projection unit 12 may be configured to be rotatable around the axis along the direction X, and the second projection unit 12 may be rotated around the axis along the direction X by the drive mechanism 13A.

Figure 25:
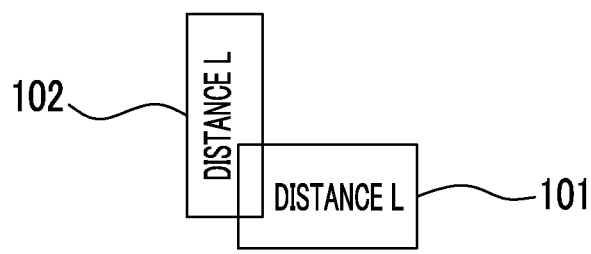
FIG. 25 is a diagram showing another modification example of a visual recognition range of a virtual image in the L-shaped screen mode of the projection type display device 1A shown in FIG. 18.

As described above, by moving the second projection unit 12 to be closer to the first projection unit 11 from the state shown in FIG. 22, for example, and rotating the second projection unit 12 around the axis along the direction X, as shown in FIG. 25, it is possible to realize a state where the visual recognition range 101 and the visual recognition range 102 overlap each other. Thus, it is possible to achieve various displays, to thereby enhance display performance.

Further, in the projection type display device 1A, by providing a difference between the length of an optical path of image light that is emitted from the first projection unit 11 and is reflected from the first enlargement projection member 11B to reach the projection surface 4 and the length of an optical path of image light that is emitted from the second projection unit 12 and is reflected from the second enlargement projection member 12Ba to reach the projection surface 4, it is possible to provide a far and near difference with respect to two virtual images.

In this case, for example, an optical path length change mechanism for moving at least one of the first image light generator 11A and the second image light generator 12A in the direction Z may be provided in the projection type display device 1A.

In the projection type display device 1A, instead of a configuration in which the second projection unit 12 is rotated by an angle of 90° around the direction Z, a configuration in which the first projection unit 11 is rotated by an angle of 90° around the direction Z may be used. With such a configuration, similarly, it is possible to achieve switching between the lateral screen mode and the L-shaped screen mode.

Further, in the projection type display device 1A, a configuration in which each of the first projection unit 11 and the second projection unit 12 is rotatable by an angle of 90° around the direction Z and the controller 60 rotate each of the first projection unit 11 and the second projection unit 12 may be used.

In this case, it is possible to achieve switching between three display modes of a lateral screen mode, a first L-shaped screen mode in which the first projection unit 11 is rotated by an angle of 90° around the direction Z from the state of the lateral screen mode, and a second L-shaped screen mode in which the second projection unit 12 is rotated by an angle of 90° around the direction Z from the state of the lateral screen mode.

With such a configuration, for example, it is possible to cope with a difference between a right steering wheel and a left steering wheel.

Third Embodiment

Figure 26:
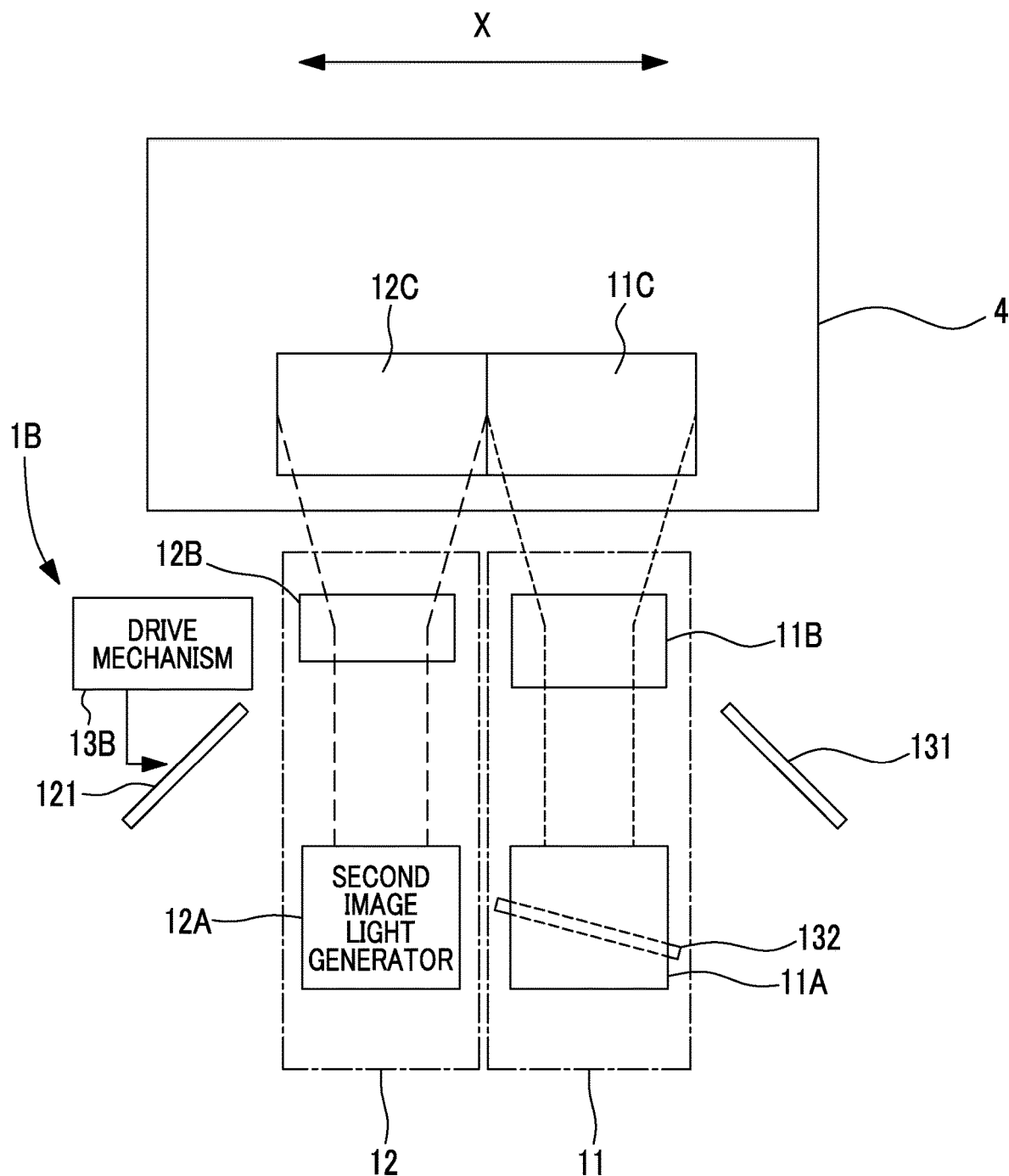
FIG. 26 is a diagram showing a schematic configuration of a projection type display device 1B that is a third embodiment of the invention, which is a schematic diagram when the projection type display device 1B is seen in the direction Y.

FIG. 26 is a diagram showing a schematic configuration of a projection type display device 1B that is a third embodiment of the invention, which is a schematic diagram when the projection type display device 1B is seen in the direction Y. In FIG. 26, the same reference numerals are given to the same configurations as in FIG. 5, and description thereof will not be repeated.

The projection type display device 1B may be set to a lateral screen mode and a longitudinal screen mode, similar to the projection type display device 1.

As shown in FIG. 26, the projection type display device 1B includes a first projection unit 11, a second projection unit 12, a drive mechanism 13B, a first reflecting member 121, and second reflecting members 131 and 132.

An internal configuration of the first projection unit 11 is the same as that of the projection type display device 1.

An internal configuration of the second projection unit 12 is the same as that of the projection type display device 1 except that the drive mechanism 13 is removed.

The first reflecting member 121 is a member for reflecting image light emitted from a second image light generator 12A, and for example, may employ a reflecting mirror. The first reflecting member 121 is configured to be able to be inserted in an optical path of the image light emitted from the second image light generator 12A.

The drive mechanism 13B is a mechanism for controlling the position of the first reflecting member 121.

A controller 60 of the first projection unit 11 or the second projection unit 12 controls the drive mechanism 13B to perform switching between an insertion state where the first reflecting member 121 is inserted between the second image light generator 12A and a second enlargement projection member 12B to reflect image light emitted from the second image light generator 12A in the direction X using the first reflecting member 121 and a withdrawal state where the first reflecting member 121 is withdrawn from between the second image light generator 12A and the second enlargement projection member 12B to cause the image light emitted from the second image light generator 12A to be incident onto the second enlargement projection member 12B.

The controller 60 that controls the drive mechanism 13B is configured of a processor that executes a projection control program stored in a ROM, and executes the projection control program to execute the control of the drive mechanism 13B.

The controller 60 drives the first reflecting member 121 to enter the withdrawal state in the lateral screen mode, and drives the first reflecting member 121 to enter the insertion state in the longitudinal screen mode.

The second reflecting member 131 is provided on an optical path of image light reflected from the first reflecting member 121 in the insertion state, and reflects the image light to be incident onto the second reflecting member 132. As the second reflecting member 131, for example, a reflecting mirror may be used.

The second reflecting member 132 is disposed on a lower side of the first image light generator 11A in the direction Y. The second reflecting member 132 reflects image light reflected from the second reflecting member 131, and causes the image light to be incident onto the first enlargement projection member 11B. As the second reflecting member 132, for example, a reflecting mirror may be used.

An optical path of image light reflected from the second reflecting member 132 is designed to be the same as an optical path of image light emitted from the second image light generator 12A in the longitudinal screen mode of the projection type display device 1 shown in FIG. 1.

Figure 27:
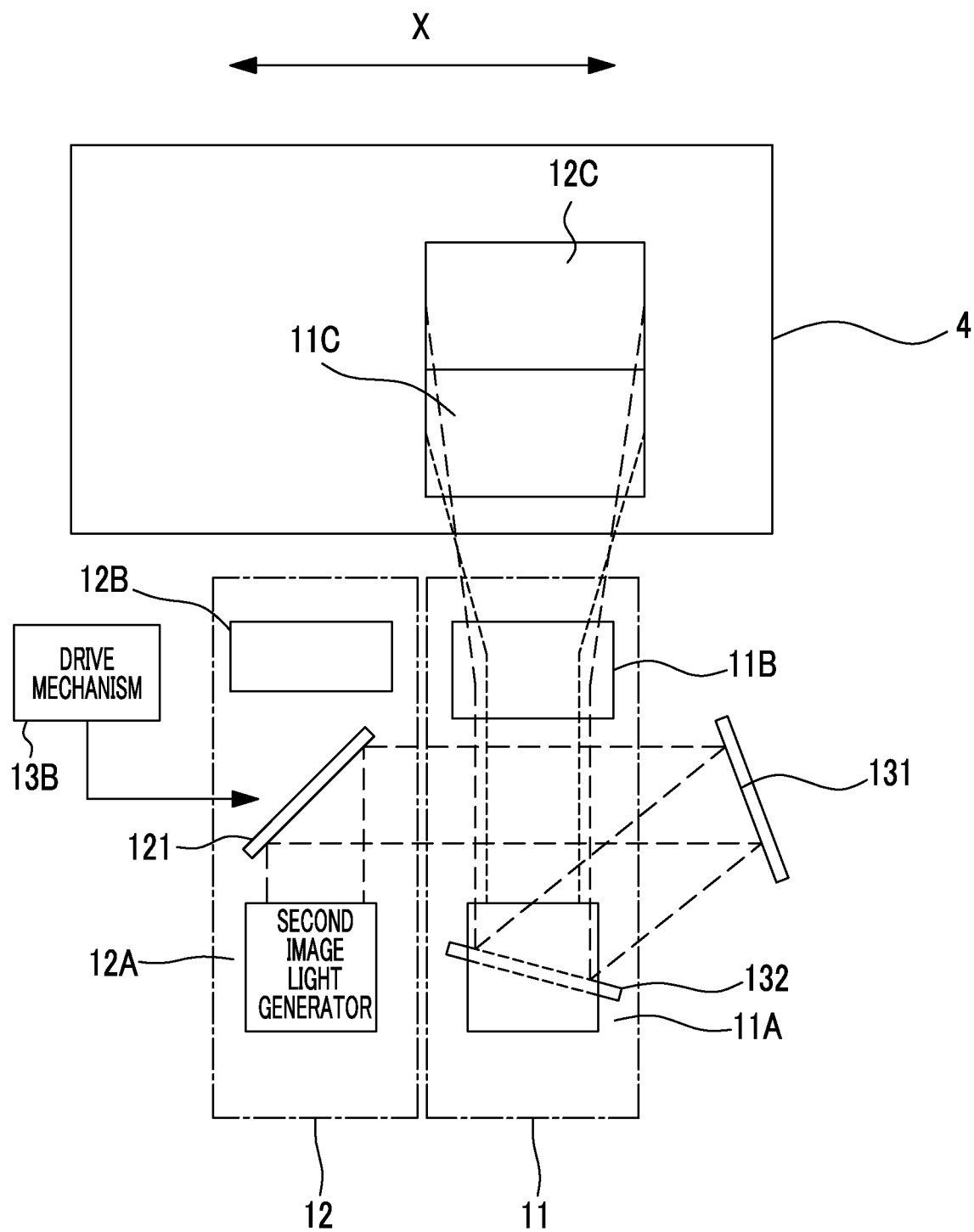
FIG. 27 is a schematic diagram when a projection state of image light in a longitudinal screen mode of the projection type display device 1B shown in FIG. 26 is seen in the direction Y.

FIG. 27 is a schematic diagram when a projection state of image light in the longitudinal screen mode of the projection type display device 1B shown in FIG. 26 is seen in the direction Y. In FIG. 27, the same reference numerals are given to the same configurations in FIG. 26, and description thereof will not be repeated.

As shown in FIG. 27, in the longitudinal screen mode, the drive mechanism 13B causes the first reflecting member 121 to be inserted between the second image light generator 12A and the second enlargement projection member 12B.

Thus, image light emitted from the second image light generator 12A is incident onto the first reflecting member 121, and is then reflected therefrom.

The image light reflected from the first reflecting member 121 is incident onto the second reflecting member 131, and is then, reflected therefrom.

The image light reflected from the second reflecting member 131 is incident onto the second reflecting member 132, and is then reflected therefrom.

The image light reflected from the second reflecting member 132 is incident onto the first enlargement projection member 11B, and is enlarged therein to then be projected onto the projection surface 4.

Figure 28:
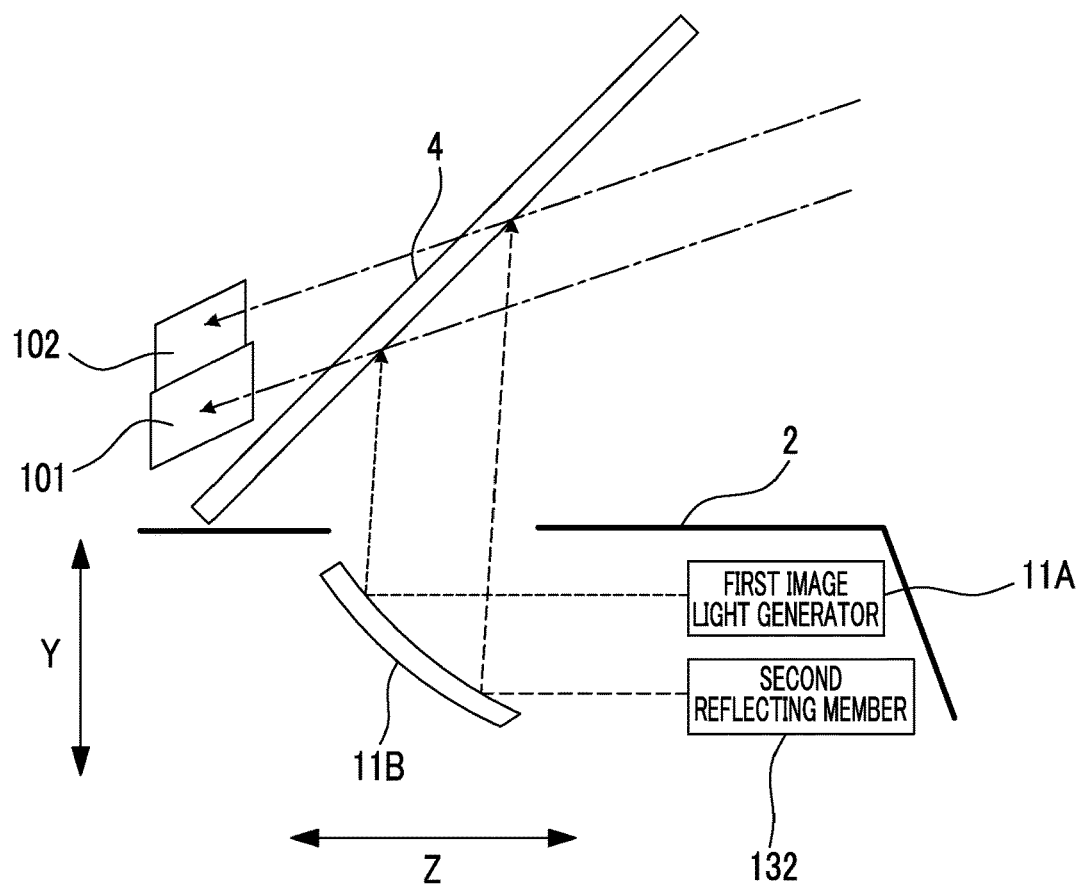
FIG. 28 is a schematic diagram when the projection state of the image light in the longitudinal screen mode of the projection type display device 1B shown in FIG. 26 is seen in the direction X.

FIG. 28 is a schematic diagram when the projection state of the image light in the longitudinal screen mode of the projection type display device 1B shown in FIG. 26 is seen in the direction X.

In the longitudinal screen mode, the length of an optical path of image light that is emitted from the first image light generator 11A and is reflected from the first enlargement projection member 11B to reach the projection surface 4 and the length of an optical path of image light that is emitted from the second image light generator 12A and is reflected from the first enlargement projection member 11B to reach the projection surface 4 become equal to each other.

Thus, a diagram showing a visual recognition range of a virtual image that is visually recognized by a driver in the projection state shown in FIG. 28 become equal to that shown in FIG. 9.

As described above, according to the projection type display device 1B, using the drive mechanism 13A for driving the first reflecting member 121 and the second reflecting members 131 and 132, is possible to perform switching between the lateral screen mode and the longitudinal screen mode. Thus, it is possible to obtain the same effects as in the projection type display device 1.

Further, according to the projection type display device 1B, it is possible to simplify the configuration of the drive mechanism 13A, to thereby reduce the manufacturing cost of the device.

In the projection type display device 1B, the first image light generator 11A or the second reflecting member 132 may be configured to be rotatable around the axis along the direction X, and the first image light generator 11A or the second reflecting member 132 may be configured to be rotated around the axis along the direction X using a drive mechanism different from the drive mechanism 13A.

With such a configuration, it is possible to realize a state where the visual recognition range 101 and the visual recognition range 102 overlap each other as shown in FIGS. 13A and 13B, in the longitudinal screen mode. Thus, it is possible to achieve various displays, to thereby enhance display performance.

Further, in the projection type display device 1B, in the longitudinal screen mode, by providing a difference between the length of an optical path of image light that is emitted from the first image light generator 11A and is reflected from the first enlargement projection member 11B to reach the projection surface 4 and the length of an optical path of image light that is emitted from the second image light generator 12A and is reflected from the first enlargement projection member 11B to reach the projection surface 4, it is possible to provide a far and near difference to two virtual images.

In this case, for example, an optical path length change mechanism for moving at least one of the second reflecting member 132 and the first image light generator 11A in the direction Z may be provided in the projection type display device 1B.

It is preferable that each of the projection type display device 1, the projection type display device 1A, and the projection type display device 1B performs switching between a state where image light generated by each of the first image light generator 11A and the second image light generator 12A is projected within an overlook angle range in which an overlook angle of a driver, calculated from the height of the eyes of the driver, in the windshield 3 becomes a predetermined angle and a state where image light generated by each of the first image light generator 11A and the second image light generator 12A is projected in a range including the overlook angle range in the windshield 3 and a range excluding the overlook angle range.

With such a configuration, it is possible to manufacture a device corresponding to each of a country where projection of image light outside an overlook angle range is prohibited and a country where projection of image light to outside an overlook angle range is allowed.

Figure 29:
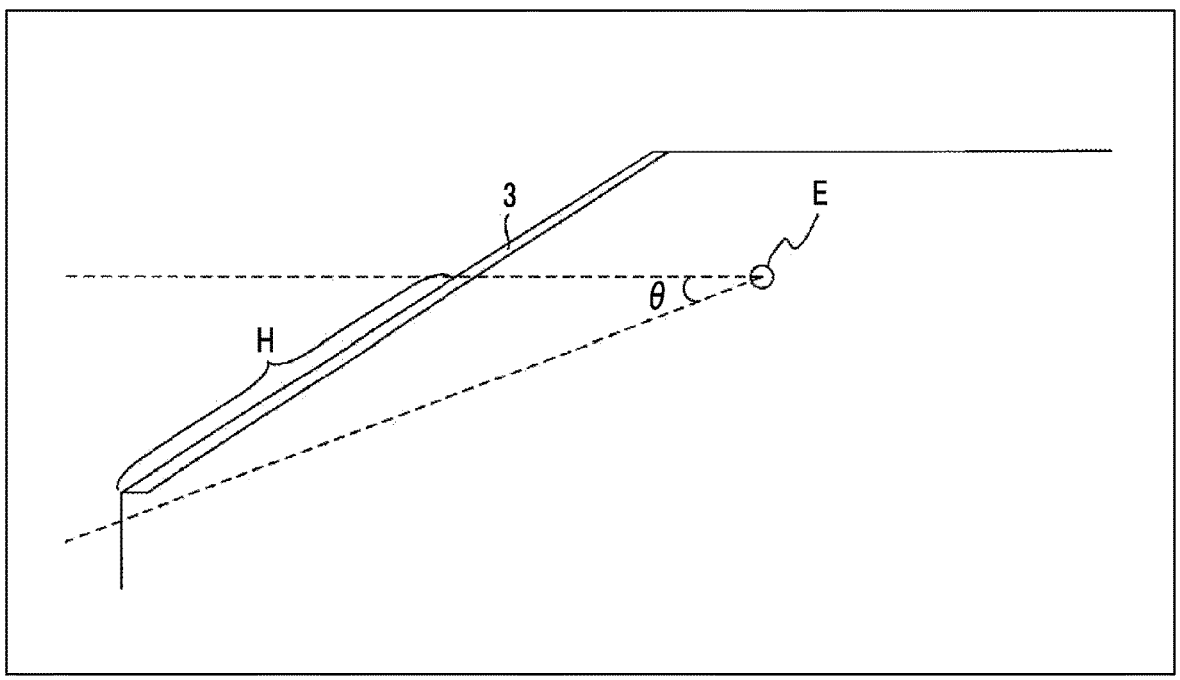
FIG. 29 is a diagram showing a relationship between an overlook angle of a driver and a windshield.

FIG. 29 is a diagram showing a relationship between an overlook angle of a driver and a windshield. A sign E shown in FIG. 29 represents a central position of a range called eyelips, eye-elips, an eye range, or an eye-box that is assumed as a range of the height of the eyes of the driver of an automobile 10. The shape of the eyelips, eye-elips, eye range, or eye-box is a rugby ball shape, for example.

A range surrounded by a plane vertical to a gravity direction including the central position E and a plane that is inclined by a predetermined angle θ toward a ground surface with respect to the former plane is an overlook angle range.

In the projection type display device 1, 1A, or 1B, by setting a range H that overlaps an overlook angle range in the windshield 3 to a range in which image light is projected in the lateral screen mode and a range including the overlook angle range in the windshield 3 and a range excluding the overlook angle range to a range in which image light is projected in the longitudinal screen mode or the L-shaped screen mode, it is possible to realize a product pursuant to each country's rule.

The angle θ varies according to countries, but it is preferable that the angle θ is set to a range based on the Japan Automobile Industry Association's guideline. Specifically, it is preferable that the angle has a range of an angle of 40° or smaller, and more preferable that the angle θ has a range of an angle of 30° or smaller. By setting the angle θ to have a range of an angle of 30° or smaller that is recommended by Japan Automobile Industry Association, it is possible to apply the invention to automobiles that are sold at least in Japan.

The projection type display device 1, 1A, or 1B include two projection units, but instead, may include three or more projection units.

In this case, by setting one projection unit among the three or more projection units as a first projection unit and setting the remaining projection units among the three or more projection units as second projection units, it is possible to perform switching between a longitudinal screen mode and a lateral screen mode, or to perform switching between the longitudinal screen mode and an L-shaped screen mode.

The plurality of display modes described above may be automatically set on the basis of surrounding circumstances of the automobile 10 by the controller 60. Specifically, the controller 60 detects the surrounding circumstances of the automobile 10, and controls the drive mechanism 13, 13A, or 13B on the basis of the detected circumstances.

For example, in the case of a vehicle such as a construction machine or heavy equipment, the controller 60 detects whether the vehicle is traveling on a public road or is under operation in a workplace on the basis of speed information or position information of the vehicle, for example.

Further, in a case where it is detected that the vehicle is traveling on the public road, the controller 60 sets a lateral screen mode, and it is detected in a case where the vehicle is under operation, the controller 60 sets a longitudinal screen mode or an L-shaped screen mode.

In addition, in the case of an automobile, the controller 60 detects whether the vehicle is traveling on an express highway or is traveling on a road other than the express highway on the basis of speed information or position information of the vehicle, for example.

Further, in a case where it is detected that the vehicle is traveling on the express highway, the controller 60 sets a lateral screen mode, and it is detected in a case where the vehicle is traveling on the road other than the express highway, the controller 60 sets a longitudinal screen mode or an L-shaped screen mode.

In this way, by automatically changing the display mode, it is possible to enhance convenience.

As described above, the following configurations are disclosed in this specification.

A disclosed projection type display device includes: a plurality of projection units that project image light to a projection surface; a drive mechanism for controlling a position, on the projection surface, of a projection range of the image light projected by at least a part of the plurality of projection units; and a controller that controls the drive mechanism and changes a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively.

In the disclosed projection type display device, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, the drive mechanism is a mechanism that changes the position of the image light generator of the second projection unit, and the controller controls the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

In the disclosed projection type display device, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, and one projection unit among the plurality of projection units is set as a first projection unit and a projection unit other than the first projection unit among the plurality of projection units is set as a second projection unit. The projection type display device further includes: a first reflecting member that reflects light; and a second reflecting member that causes light reflected from the first reflecting member to be incident onto the enlargement projection member of the first projection unit. The drive mechanism is a mechanism that changes the position of the first reflecting member, and the controller controls the drive mechanism to perform switching between a state where the first reflecting member is inserted between the image light generator and the enlargement projection member of the second projection unit to cause image light emitted from the image light generator of the second projection unit to be reflected by the first reflecting member and a state where the first reflecting member is withdrawn from between the image light generator and the enlargement projection member of the second projection unit to cause the image light emitted from the image light generator of the second projection unit to be incident onto the enlargement projection member of the second projection unit.

In the disclosed projection type display device, the enlargement projection member of the first projection unit is larger than the enlargement projection member of the second projection unit.

In the disclosed projection type display device, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, and the drive mechanism is a mechanism for rotating the image light generator and the enlargement projection member of the second projection unit around an axis along an emission direction of image light emitted from the image light generator.

In the disclosed projection type display device, the controller controls the drive mechanism to perform switching a state where a longitudinal direction of a first image based on image light emitted from the image light emitting member of the first projection unit matches a longitudinal direction of a second image based on image light emitted from the image light emitting member of the second projection unit and a state where the longitudinal direction of the first image matches a transverse direction of the second image.

The disclosed projection type display device further includes an optical path length control mechanism that controls a length of an optical path of image light projected from at least a part of the plurality of projection units.

In the disclosed projection type display device, the projection surface is a windshield of a vehicle, and the controller controls the drive mechanism to perform switching between a state where image light is projected by each of the plurality of projection units within an overlook angle range in which an overlook angle of a driver of the vehicle, calculated from the height of the eyes of the driver, in the windshield becomes a predetermined angle and a state where image light is projected by each of the plurality of projection units in a range including the overlook angle range and a range excluding the overlook angle range.

In the disclosed projection type display device, the predetermined angle has a range of an angle of 40° or smaller.

In the disclosed projection type display device, the predetermined angle has a range of an angle of 30° or smaller.

In the disclosed projection type display device, the projection surface is a windshield of a vehicle, and the controller controls the drive mechanism on the basis of surrounding circumstances of the vehicle.

A disclosed projection control method includes: a control step of controlling a drive mechanism for controlling a position, on a projection surface, of a projection range of image light projected by at least a part of a plurality of projection units that project the image light onto a projection surface to change a length, in one direction, of a range obtained by combining projection ranges of image light projected by the plurality of projection units and a length, in a direction orthogonal to the one direction, of the range obtained by combining the projection ranges of the image light projected by the plurality of projection units.

In the disclosed projection control method, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, and the control step includes controlling the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

In the disclosed projection control method, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, the drive mechanism is a mechanism that changes the position of the first reflecting member that reflects light, the control step includes controlling the drive mechanism to perform switching between a state where the first reflecting member is inserted between the image light generator and the enlargement projection member of the second projection unit to cause image light emitted from the image light generator of the second projection unit to be reflected by the first reflecting member and to cause the image light reflected from the first reflecting member to be incident onto the second reflecting member and a state where the first reflecting member is withdrawn from between the image light generator and the enlargement projection member of the second projection unit to cause the image light emitted from the image light generator of the second projection unit to be incident onto the enlargement projection member of the second projection unit, and the second reflecting member causes the image light reflected from the first reflecting member to be incident onto the enlargement projection member of the first projection unit.

In the disclosed projection control method, the enlargement projection member of the first projection unit is larger than the enlargement projection member of the second projection unit.

In the disclosed projection control method, each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, and the drive mechanism is a mechanism for rotating the image light generator and the enlargement projection member of the second projection unit around an axis along an emission direction of image light emitted from the image light generator.

In the disclosed projection control method, the control step includes controlling the drive mechanism to perform switching a state where a longitudinal direction of a first image based on image light emitted from the image light emitting member of the first projection unit matches a longitudinal direction of a second image based on image light emitted from the image light emitting member of the second projection unit and a state where the longitudinal direction of the first image matches a transverse direction of the second image.

In the disclosed projection control method, the projection surface is a windshield of a vehicle, and the control step includes controlling the drive mechanism to perform switching between a state where image light is projected by each of the plurality of projection units within an overlook angle range in which an overlook angle of a driver of the vehicle, calculated from the height of the eyes of the driver, in the windshield becomes a predetermined angle and a state where image light is projected by each of the plurality of projection units in a range including the overlook angle range and a range excluding the overlook angle range.

In the disclosed projection control method, the predetermined angle has a range of an angle of 40° or smaller.

In the disclosed projection control method, the predetermined angle has a range of an angle of 30° or smaller.

In the disclosed projection control method, the projection surface is a windshield of a vehicle, and the control step includes controlling the drive mechanism on the basis of surrounding circumstances of the vehicle.

A disclosed projection control program that causes a computer to execute: a control step of controlling a drive mechanism for controlling a position, on a projection surface, of a projection range of image light projected by at least a part of a plurality of projection units that project the image light onto a projection surface to change a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively.

A disclosed projection type display device includes: a plurality of projection units that project image light to a projection surface; a drive mechanism for controlling a position, on the projection surface, of a projection range of the image light projected by at least a part of the plurality of projection units; and a control processor that controls the drive mechanism and changes a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively. Each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, one projection unit among the plurality of projection units is set as a first projection unit and a projection unit other than the first projection unit among the plurality of projection units is set as a second projection unit, the drive mechanism is a mechanism that changes the position of the image light generator of the second projection unit, and the control processor controls the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

According to the invention, it is possible to provide a projection type display device, a projection control method, and a projection control program capable of smoothly changing shapes of projection ranges of image light.

EXPLANATION OF REFERENCES

10: automobile
1, 1A, 1B: projection type display device
2: dashboard
3: windshield
4: projection surface
11: first projection unit
11A: first image light generator
11B: first enlargement projection member
12: second projection unit
12A: second image light generator
12B, 12Ba: second enlargement projection member
13, 13A, 13B: drive mechanism
40: light source unit
40A: light source controller
41r: R light source
41g: G light source
41b: B light source
42r, 42g, 42b: collimator lens
43: dichroic prism
44: light modulation element
45: drive section
50: diffusion member
60: controller
70: operating section
11C: first projection range
101, 102: visual recognition range of virtual image
12C: second projection range
121: first reflecting member
131, 132: second reflecting member
E: central position of eye-box
H: range that overlaps overlook angle range in windshield

What is claimed is:

1. A projection type display device comprising:
a plurality of projection units that project image light to a projection surface;
a drive mechanism for controlling a position, on the projection surface, of a projection range of the image light projected by at least a part of the plurality of projection units; and
a controller that controls the drive mechanism and changes a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively, wherein each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface,
wherein one projection unit among the plurality of projection units is set as a first projection unit and a projection unit other than the first projection unit among the plurality of projection units is set as a second projection unit,
wherein the drive mechanism is a mechanism that changes the position of the image light generator of the second projection unit, and
wherein the controller controls the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

2. The projection type display device according to claim 1, further comprising:
a first reflecting member that reflects light; and
a second reflecting member that causes light reflected from the first reflecting member to be incident onto the enlargement projection member of the first projection unit,
wherein the drive mechanism is a mechanism that changes the position of the first reflecting member, and
wherein the controller controls the drive mechanism to perform switching between a state where the first reflecting member is inserted between the image light generator and the enlargement projection member of the second projection unit to cause image light emitted from the image light generator of the second projection unit to be reflected by the first reflecting member and a state where the first reflecting member is withdrawn from between the image light generator and the enlargement projection member of the second projection unit to cause the image light emitted from the image light generator of the second projection unit to be incident onto the enlargement projection member of the second projection unit.

3. The projection type display device according to claim 1,
wherein the enlargement projection member of the first projection unit is larger than the enlargement projection member of the second projection unit.

4. The projection type display device according to claim 1,
wherein the drive mechanism is a mechanism for rotating the image light generator and the enlargement projection member of the second projection unit around an axis along an emission direction of image light emitted from the image light generator.

5. The projection type display device according to claim 4,
wherein the controller controls the drive mechanism to perform switching a state where a longitudinal direction of a first image based on image light emitted from the image light emitting member of the first projection unit matches a longitudinal direction of a second image based on image light emitted from the image light emitting member of the second projection unit and a state where the longitudinal direction of the first image matches a transverse direction of the second image.

6. The projection type display device according to claim 1, further comprising:
an optical path length control mechanism that controls a length of an optical path of image light projected from at least a part of the plurality of projection units.

7. The projection type display device according to claim 1,
wherein the projection surface is a windshield of a vehicle, and
wherein the controller controls the drive mechanism to perform switching between a state where image light is projected by each of the plurality of projection units within an overlook angle range in which an overlook angle of a driver of the vehicle, calculated from the height of the eyes of the driver, in the windshield becomes a predetermined angle and a state where image light is projected by each of the plurality of projection units in a range including the overlook angle range and a range excluding the overlook angle range.

8. The projection type display device according to claim 7,
wherein the predetermined angle has a range of an angle of 40° or smaller.

9. The projection type display device according to claim 8,
wherein the predetermined angle has a range of an angle of 30° or smaller.

10. The projection type display device according to claim 1,
wherein the projection surface is a windshield of a vehicle, and
wherein the controller controls the drive mechanism on the basis of surrounding circumstances of the vehicle.

11. A projection control method of the projection type display device according to claim 1 comprising:
a control step of controlling the drive mechanism for controlling a position, on the projection surface, of a projection range of image light projected by at least a part of a plurality of projection units that project the image light onto the projection surface to change a length, in one direction, of the range obtained by combining projection ranges of the image light projected by the plurality of projection units and a length, in the direction orthogonal to the one direction, of the range obtained by combining the projection ranges of the image light projected by the plurality of projection units,
wherein the control step includes controlling the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

12. The projection control method according to claim 11,
wherein the drive mechanism is a mechanism that changes the position of the first reflecting member that reflects light,
wherein the control step includes controlling the drive mechanism to perform switching between a state where the first reflecting member is inserted between the image light generator and the enlargement projection member of the second projection unit to cause image light emitted from the image light generator of the second projection unit to be reflected by the first reflecting member and to cause the image light reflected from the first reflecting member to be incident onto the second reflecting member and a state where the first reflecting member is withdrawn from between the image light generator and the enlargement projection member of the second projection unit to cause the image light emitted from the image light generator of the second projection unit to be incident onto the enlargement projection member of the second projection unit, and
wherein the second reflecting member causes the image light reflected from the first reflecting member to be incident onto the enlargement projection member of the first projection unit.

13. The projection control method according to claim 11,
wherein the enlargement projection member of the first projection unit is larger than the enlargement projection member of the second projection unit.

14. The projection control method according to claim 11,
wherein the drive mechanism is a mechanism for rotating the image light generator and the enlargement projection member of the second projection unit around an axis along an emission direction of image light emitted from the image light generator.

15. The projection control method according to claim 14,
wherein the control step includes controlling the drive mechanism to perform switching a state where a longitudinal direction of a first image based on image light emitted from the image light emitting member of the first projection unit matches a longitudinal direction of a second image based on image light emitted from the image light emitting member of the second projection unit and a state where the longitudinal direction of the first image matches a transverse direction of the second image.

16. The projection control method according to claim 11,
wherein the projection surface is a windshield of a vehicle, and
wherein the control step includes controlling the drive mechanism to perform switching between a state where image light is projected by each of the plurality of projection units within an overlook angle range in which an overlook angle of a driver of the vehicle, calculated from the height of the eyes of the driver, in the windshield becomes a predetermined angle and a state where image light is projected by each of the plurality of projection units in a range including the overlook angle range and a range excluding the overlook angle range.

17. The projection control method according to claim 16,
wherein the predetermined angle has a range of an angle of 40° or smaller.

18. The projection control method according to claim 17,
wherein the predetermined angle has a range of an angle of 30° or smaller.

19. The projection control method according to claim 11,
wherein the projection surface is a windshield of a vehicle, and
wherein the control step includes controlling the drive mechanism on the basis of surrounding circumstances of the vehicle.

20. A non-transitory recording medium readable by a computer for recording a projection control program that causes a computer to execute a projection control method of the projection type display device according to claim 1:
a control step of controlling the drive mechanism for controlling a position, on the projection surface, of a projection range of image light projected by at least a part of a plurality of projection units that project the image light onto the projection surface to change a length, in one direction, of the range obtained by combining projection ranges of the image light projected by the plurality of projection units and a length, in the direction orthogonal to the one direction, of the range obtained by combining the projection ranges of the image light projected by the plurality of projection units, respectively, wherein the control step includes controlling the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

21. A projection type display device comprising:
a plurality of projection units that project image light to a projection surface;
a drive mechanism for controlling a position, on the projection surface, of a projection range of the image light projected by at least a part of the plurality of projection units; and
a control processor that controls the drive mechanism and changes a length, in one direction, of a range obtained by combining projection ranges of the image light projected by the plurality of projection units and a length, in a direction orthogonal to the one direction, of the range obtained by combining the projection ranges of the image light projected by the plurality of projection units, respectively, wherein each of the plurality of projection units includes an image light generator that includes a light source, a light modulation element that spatially modulates light emitted from the light source on the basis of image data, and an image light emitting member that emits image light obtained by the spatial modulation, and an enlargement projection member that enlarges the image light emitted from the image light emitting member and projects the enlarged image light onto the projection surface, wherein one projection unit among the plurality of projection units is set as a first projection unit and a projection unit other than the first projection unit among the plurality of projection units is set as a second projection unit, wherein the drive mechanism is a mechanism that changes the position of the image light generator of the second projection unit, and wherein the control processor controls the drive mechanism to perform switching between a state where image light emitted from the image light generator of the second projection unit is incident onto the enlargement projection member of the second projection unit and a state where the image light emitted from the image light generator of the second projection unit is incident onto the enlargement projection member of the first projection unit.

* * * * *